(12) United States Patent
DeLorenzo et al.

(10) Patent No.: US 11,388,242 B2
(45) Date of Patent: Jul. 12, 2022

(54) MULTI-JURISDICTIONAL ENDPOINT ALLOCATION COMPLIANCE

(71) Applicant: Twilio Inc., San Francisco, CA (US)

(72) Inventors: Michael DeLorenzo, San Francisco, CA (US); Andrew Ryno, Oakland, CA (US); Sunil Thamatam, San Ramon, CA (US); Shawn Parker, San Leandro, CA (US); Rahul Sanghavi, Fremont, CA (US); Nick Vlku, Oakland, CA (US); Patrick Loomis, San Fancisco, CA (US)

(73) Assignee: Twilio Inc., San Francisco, CA (US)

( * ) Notice: Subject to any disclaimer, the term of this patent is extended or adjusted under 35 U.S.C. 154(b) by 0 days.

(21) Appl. No.: 17/359,889

(22) Filed: Jun. 28, 2021

(65) Prior Publication Data

US 2021/0329076 A1   Oct. 21, 2021

Related U.S. Application Data

(63) Continuation of application No. 16/985,640, filed on Aug. 5, 2020, now Pat. No. 11,153,390.

(60) Provisional application No. 62/882,805, filed on Aug. 5, 2019.

(51) Int. Cl.
| | |
|---|---|
| *H04L 67/141* | (2022.01) |
| *H04L 67/147* | (2022.01) |
| *G06F 16/21* | (2019.01) |
| *H04L 67/1001* | (2022.01) |
| *H04L 67/146* | (2022.01) |

(52) U.S. Cl.
CPC .......... *H04L 67/141* (2013.01); *G06F 16/213* (2019.01); *H04L 67/1002* (2013.01); *H04L 67/146* (2013.01); *H04L 67/147* (2013.01)

(58) Field of Classification Search
CPC .................................................... G06F 16/213
See application file for complete search history.

(56) References Cited

U.S. PATENT DOCUMENTS

| | | |
|---|---|---|
| 10,924,887 B2 | 2/2021 | Frusina et al. |
| 2013/0007734 A1 | 1/2013 | Mccloy |
| 2013/0275376 A1 | 10/2013 | Hudlow et al. |
| 2020/0133640 A1 | 4/2020 | Thiru et al. |

(Continued)

OTHER PUBLICATIONS

"U.S. Appl. No. 16/985,640, Notice of Allowance dated Jun. 22, 2021", 9 pgs.

(Continued)

*Primary Examiner* — Brian Whipple
(74) *Attorney, Agent, or Firm* — Schwegman Lundberg & Woessner, P.A.

(57) ABSTRACT

Disclosed are systems, methods, and non-transitory computer-readable media for multi-jurisdictional endpoint allocation compliance. A multi-jurisdictional endpoint allocation system receives a request to allocate an endpoint in a jurisdiction to an account and accesses a regulation data object for the jurisdiction. The regulation data object identifies a set of jurisdictional requirements for the jurisdiction and a set of actions to be performed to satisfy the set of jurisdictional requirements for the jurisdiction. The multi-jurisdictional endpoint allocation system allocates an endpoint in the jurisdiction to the account and executes the set of actions associated with the regulation data object to satisfy the set of jurisdictional requirements for the jurisdiction.

20 Claims, 13 Drawing Sheets

(56) References Cited

U.S. PATENT DOCUMENTS

2020/0341876 A1 10/2020 Gandhi
2021/0044658 A1 2/2021 Delorenzo et al.

OTHER PUBLICATIONS

U.S. Appl. No. 16/985,640, filed Aug. 5, 2020, Multi-Jurisdictional Endpoint Allocation Compliance.

1100

RECEIVE A REQUEST TO UPDATE A SET OF JURISDICTIONAL REQUIREMENTS FOR A JURISDICTION
1102

ACCESS A REGUALTION DATA OBJECT FOR THE JURISDITION
1104

MODIFY THE REGULATION DATA OBJECT BASED ON THE REQUEST
1106

DETERMINE WHETHER A MODIFIED SET OF JURISDICTIONAL REQUIREMENTS FOR THE JURISDICTION ARE SATISFIED BASED ON A DATA BUNDLE ASSOCIATED WITH AN ALLOCATED ENDPOINT IN THE JURISDICTION
1108

*FIG. 11*

MULTI-JURISDICTIONAL ENDPOINT ALLOCATION COMPLIANCE

PRIORITY APPLICATION

This application is a continuation of U.S. patent application Ser. No. 16/985,640, filed Aug. 5, 2020, which application claims priority to U.S. Provisional Application Ser. No. 62/882,805, filed Aug. 5, 2019, the disclosures of which are incorporated herein in their entireties by reference.

TECHNICAL FIELD

An embodiment of the present subject matter relates generally to cloud-based communication services and, more specifically, to a multi-jurisdictional endpoint allocation compliance.

BACKGROUND

In the current multinational world, clients often use endpoints (e.g., phone numbers, messenger accounts, etc.) allocated in a variety of jurisdictions, such as in different countries (e.g., USA, Germany, France, China, etc.) or with different online service providers (e.g., Facebook, WhatsApp, Snapchat, etc.). Each jurisdiction is governed by unique compliance rules and procedures that dictate actions to be performed to successfully allocate an endpoint in the given jurisdiction. Currently, complying with each jurisdiction's compliance rules is performed manually, which is both resource intensive and slow. Accordingly, improvements are needed.

SUMMARY

A cloud-based communication platform (e.g., Twilio) provides its customers with the ability to allocate endpoints (e.g., phone numbers, messenger accounts, etc.) from multiple jurisdictions to their individual accounts. An endpoint is a communication endpoint that facilitates communication with other endpoints in a communication network. One example of an endpoint is a phone number that allows for incoming and outgoing communication to other endpoints (e.g., phone numbers) or associated devices. As another example, an endpoint is an account for an instant messenger application that allows for incoming and outgoing communication to other endpoints (e.g., instant messaging accounts) in the communication network. A jurisdiction is an entity (e.g., county, company, governing body, etc.) that maintains or manages control over a set of endpoints and/or a specific communication network. For example, a jurisdiction may be a country or governing body that controls phone numbers associated with a particular geographic region, country calling code, etc. As another example, a jurisdiction may be a company that provides an instant messaging application (e.g., Facebook).

The cloud-based communication platform allows its customers to submit allocation requests for endpoints from a given jurisdiction to be allocated to their account. Allocating an endpoint to a customer's account provides the customer with use of the allocated endpoint. For example, a company may request that a phone number within a selected country be allocated to their account to be used for communications by a new employee of the company that is located within the country.

As explained earlier, each jurisdiction is governed by unique compliance regulations and procedures that dictate actions to be performed to successfully allocate an endpoint in the given jurisdiction. For example, one country may require that a certain set of forms be filled out and submitted when allocating an endpoint within the jurisdiction, while another country may require a different set of forms. As another example, one jurisdiction may require that populated forms be submitted via mail, while another jurisdiction may require that the forms be populated and submitted online. Manually complying with the unique jurisdictional requirements of each jurisdiction is a daunting and error prone task.

To alleviate this issue, the multi-jurisdictional endpoint allocation system automates the compliance process. For example, the multi-jurisdictional endpoint allocation system maintains a regulation database that includes a separate set of compliance regulations for each jurisdiction in which the multi-jurisdictional endpoint allocation system facilitates endpoint allocation.

The set of compliance regulations for a jurisdiction can be defined as a regulation data object ("regulation object"). Each regulation object may define a set of individual jurisdictional requirements for complying with the associated set of compliance regulations for the jurisdiction. For example, a jurisdictional requirement may include providing a name to be associated with the allocated endpoint, such as a human user's name and/or fictitious business name associated with the customer to which the endpoint is being allocated. Each jurisdictional requirement may further be associated with one or more supporting proof items that satisfy the jurisdictional requirement. For example, a jurisdictional requirement for providing a name may be associated with supporting proof items such as a passport, driver's license, or other type of government issued identifier that includes a matching name.

Each regulation object may further be associated with a set of actions to be performed such as, populating certain forms, submitting the populated forms in a defined manner, etc. When a customer submits a request to allocate an endpoint in a given jurisdiction to their account, the multi-jurisdictional endpoint allocation system accesses the regulation object and performs the corresponding actions to satisfy the individual jurisdictional requirements for the given jurisdiction.

Some of the actions may be executed by the multi-jurisdictional endpoint allocation system without user intervention. For example, the multi-jurisdictional endpoint allocation system may be able to populate and submit forms in some jurisdictions without user intervention. Some actions, however, may require some human intervention. For example, some jurisdictions may require that physical signatures be provided on forms and/or that physical copies of the forms be provided via mail. In these types of situations, the multi-jurisdictional endpoint allocation system may perform the actions by generating instructions and/or a workflow that identifies the actions to be performed by a user to satisfy the jurisdictional requirements. The multi-jurisdictional endpoint allocation system may then provide the instructions and/or workflow to a designated user or users of the associated customer. The actions performed by the user may be in conjunction with actions performed by the multi-jurisdictional endpoint allocation system. For example, the multi-jurisdictional endpoint allocation system may populate a form and provide the form to a designated human user along with instructions on how to complete and properly submit the form, such as by signing the form and mailing a physical copy to a specified address.

In some embodiments, the actions associated with a regulation object may include sets of actions designated to be performed by different roles of users. For example, a set of actions may be designated to be performed by a user in an administrator role, a user in a reviewer role, a customer role, and the like. In this type of embodiment, the multi-jurisdictional endpoint allocation system performs the set of actions defined for each role. For example, the multi-jurisdictional endpoint allocation system may prompt a user in one role to provide specified data, populate a form based on the provided data, and then provide the populated form to a user in a different role for signature and submission.

In some embodiments, the multi-jurisdictional endpoint allocation system may allow customers to customize the actions performed by the multi-jurisdictional endpoint allocation system when endpoints are allocated to their account. For example, some customers may wish to add additional steps to the compliance process that are not necessarily required to satisfy the jurisdictional requirements of the jurisdiction, such as providing populated forms for review, sending notifications to internal users, etc. The multi-jurisdictional endpoint allocation system may maintain a set of customer actions for each account indicating any additional actions that the customer has requested to be performed when allocating endpoints to the customer's account.

One advantage of maintaining a regulation database with regulation objects for each jurisdiction is that updates can be made quickly and seamlessly when a jurisdiction modifies their jurisdictional requirements. For example, the multi-jurisdictional endpoint allocation system simply updates the regulation object and corresponding actions for the jurisdiction in the regulation database to account for changes to the jurisdictional requirements. Once updated, the multi-jurisdictional endpoint allocation system performs subsequent compliance processes for the jurisdiction based on the updated regulation object and corresponding actions.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 11 is a flowchart showing a method for updating jurisdictional requirements, according to some example embodiments.

DETAILED DESCRIPTION

Figure 1:
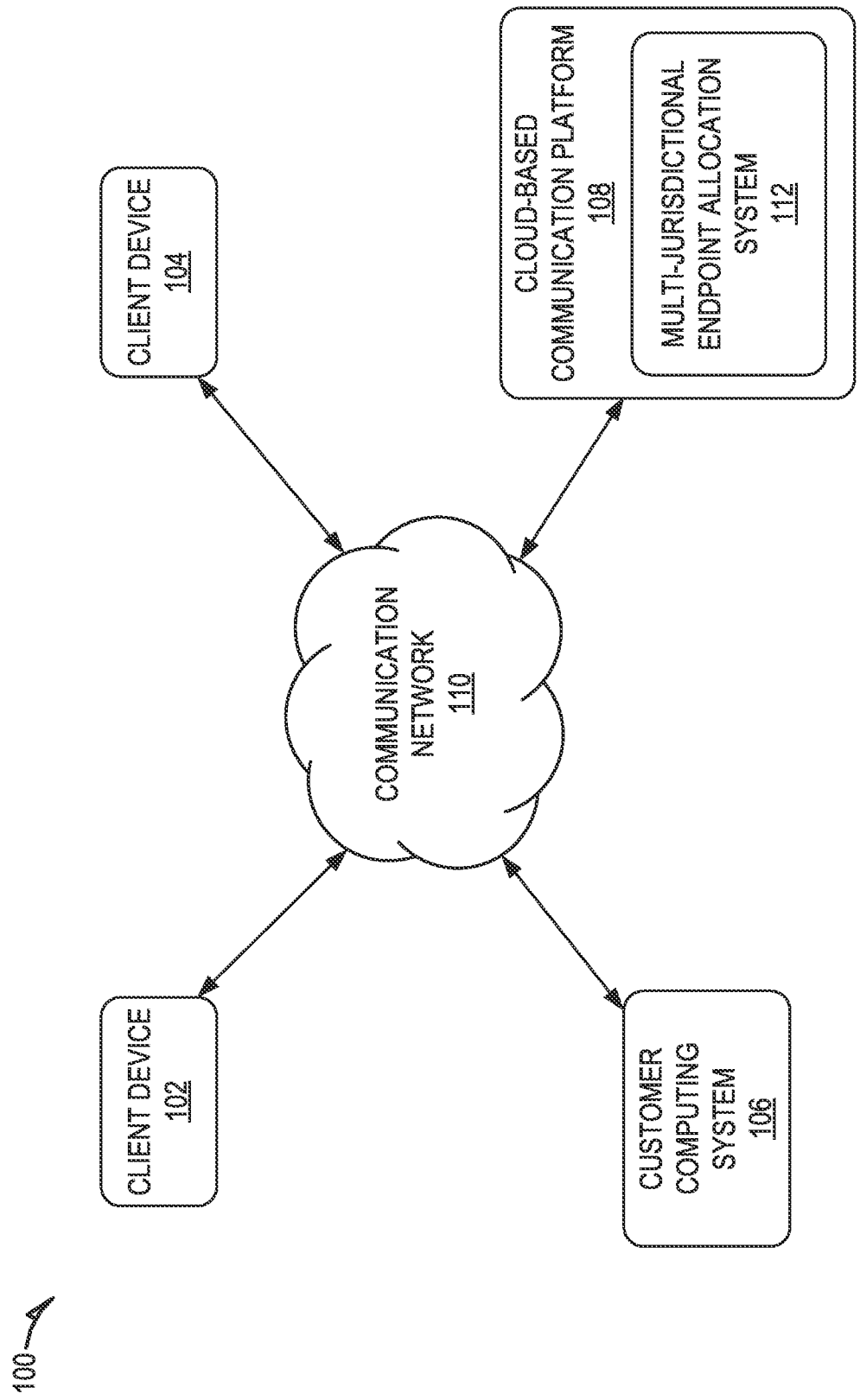
FIG. 1 is a block diagram of a system for multi-jurisdictional endpoint allocation compliance, according to some example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for multi-jurisdictional endpoint allocation compliance. FIG. 11 is a block diagram of a system 100 for multi-jurisdictional endpoint allocation compliance, according to some example embodiments. As shown, multiple devices (i.e., client device 102, client device 104, customer computing system 106, and cloud-based communication platform 108) are connected to a communication network 110 and configured to communicate with each other through use of the communication network 110. The communication network 110 is any type of network, including a local area network (LAN), such as an intranet, a wide area network (WAN), such as the internet, or any combination thereof. Further, the communication network 110 may be a public network, a private network, or a combination thereof. The communication network 110 is implemented using any number of communication links associated with one or more service providers, including one or more wired communication links, one or more wireless communication links, or any combination thereof. Additionally, the communication network 110 is configured to support the transmission of data formatted using any number of protocols.

Multiple computing devices can be connected to the communication network 110. A computing device is any type of general computing device capable of network communication with other computing devices. For example, a computing device can be a personal computing device such as a desktop or workstation, a business server, or a portable computing device, such as a laptop, smart phone, or a tablet personal computer (PC). A computing device can include some or all of the features, components, and peripherals of the machine 1300 shown in FIG. 13.

To facilitate communication with other computing devices, a computing device includes a communication interface configured to receive a communication, such as a request, data, and the like, from another computing device in network communication with the computing device and pass the communication along to an appropriate components/modules running on the computing device. The communication interface also sends a communication to another computing device in network communication with the computing device.

The customer computing system 106 is one or more computing devices associated with a customer of the cloud-based communication platform 108. A customer may be any type of a person, entity, business, or the like, that utilizes the communication functionality of the cloud-based communication platform. For example, a customer may be a bank, retail store, restaurant, and the like.

In some embodiments, a customer may provide an online service that may be accessed by users via the communication network 110. In these types of embodiments, the customer computing system 106 may facilitate functioning of the provided online service. For example, users may use the client devices 102 and 104 that are connected to the communication network 110 to interact with the customer computing system 106 and utilize the online service. The online service may be any type of service provided online, such as a ride-sharing service, reservation service, retail service, news service, etc.

Although the shown system 100 includes only two client devices 102, 104 and one customer computing system 106, this is only for ease of explanation and is not meant to be limiting. One skilled in the art would appreciate that the system 100 can include any number of client devices 102, 104 and/or customer computing systems 106. Further, the customer computing system 106 may concurrently accept connections from and interact with any number of client devices 102, 104. The customer computing system 106 may supports connections from a variety of different types of client devices 102, 104, such as desktop computers; mobile computers; mobile communications devices, e.g., mobile phones, smart phones, tablets; smart televisions; set-top boxes; and/or any other network enabled computing devices. Hence, the client devices 102 and 104 may be of varying type, capabilities, operating systems, and so forth.

A user interacts with the customer computing system 106 via a client-side application installed on the client devices 102 and 104. In some embodiments, the client-side application includes a component specific to the online service provided by the customer computing system 106. For example, the component may be a stand-alone application, one or more application plug-ins, and/or a browser extension. However, the users may also interact with the customer computing system 106 via a third-party application, such as a web browser, that resides on the client devices 102 and 104 and is configured to communicate with the customer computing system 106. In either case, the client-side application presents a user interface (UI) for the user to interact with the customer computing system 106 to utilize the provided online service. For example, the user interacts with the customer computing system 106 via a client-side application integrated with the file system or via a webpage displayed using a web browser application.

The cloud-based communication platform 108 provides communication services for multiple accounts/customers of the cloud-based communication platform 108. Each account may be associated with a different customer of the cloud-based communication platform 108 (e.g., individual user, set of users, company, organization, online service, etc.). The cloud-based communication platform 108 may provide a variety of cloud-based communication services, such as facilitating communication sessions (e.g., phone calls, messaging, and the like) between endpoints (e.g., phone numbers), managing incoming communication requests, routing communication requests to an appropriate endpoint, logging data associated with communication sessions, etc. A communication session is any type of communication between two or more client devices 102, 104. For example, a communication session may be a synchronous communication session, such as a voice communication session (e.g., phone call), video communication session (e.g., video conference), and the like. A communication session may also be an asynchronous communication session, such as text communication, chat session, and the like.

The cloud-based communication platform 108 may allocate endpoints (e.g., phone numbers, URLs, and the like) to customers for use in facilitating communications. Communications directed to the allocated endpoints are received and managed by the cloud-based communication platform 108 according to configurations selected by the customer. For example, the customer may designate an allocated endpoint to a specific client device 102 causing communications directed to the endpoint to be routed by the cloud-based communication platform 108 to the designated client device 102. As another example, the customer may designate an endpoint to direct communications to a customer call center. As a result, the cloud-based communication platform 108 may route communications directed to the endpoint to one of the customer's available call center agents.

The cloud-based communication platform 108 may also provide customers with an Application Programming Interface (API) that enables the customers to programmatically communicate with and utilize the functionality of the cloud-based communication platform 108. The API may include specific API commands to invoke specified functionality of the cloud-based communication platform 108. For example, the API may define the syntax and format for the API command, including the parameters to include in the API command to initiate the desired functionality, such as initiating a communication session (e.g., phone call, chat session), transmitting an email message, and the like.

A customer may use the API to directly communicate with and utilize the communication services provided by the cloud-based communication platform 108. For example, a customer may use the API to transmit API commands from the customer computing system 106 to the cloud-based communication platform 108 to cause performance of specified functionality, such as initiating a communication session, transmitting an email, and the like.

A customer may also use the API provided by the cloud-based communication platform 108 to incorporate the communication services provided by the cloud-based communication platform 108 into the customer's application or website. For example, the customer may include API commands from the API into the source code of the programming application and/or website to cause the application and/or website to communicate with the cloud-based communication platform 108 to provide communication services provided by the cloud-based communication platform 108.

As an example, a customer that provides an online service such as a ride sharing application may utilize the communication services provided by the cloud-based communication platform 108 to enable users and drivers of the ride sharing application to communicate with each other. For example, the ride sharing application may include a user interface element that may be selected by a user to initiate a communication session with their driver. Selection of the user interface element may cause the customer computing system 106 to transmit an API command to the cloud-based communication platform 108 to initiate a communication session between client devices 102, 104 of the user and driver. Similarly, a customer that provides a dating application may utilize the communication services provided by the cloud-based communication platform 108 to enable users of the dating application to communicate with each other, such as by sending messages, initiating a call, and the like.

Users of the application may not have knowledge that the communication services they are using through the application are being facilitated by the cloud-based communication platform 108. That is, the communication services may be presented as being a part of the application itself rather than provided by the cloud-based communication platform 108. In this way, the communication services facilitated by the cloud-based communication platform 108 are provided as a SaaS.

The cloud-based communication platform 108 enables customers to configure performance of the communication services provided by the cloud-based communication platform 108. For example, the cloud-based communication platform 108 enables its customers to configure a set of communication instructions dictating actions to be performed by the cloud-based communication platform 108. For example, a customer may configure a set of communication instructions to be executed by the cloud-based communication platform 108 in response to the cloud-based communication platform 108 receiving an incoming communication associated with the customer, such as receiving an incoming communication directed to an endpoint allocated to the customer. As another example, a customer may transmit a communication to the cloud-based communication platform 108 to execute a set of communication instructions.

The set of communication instructions may include individual commands that dictate the actions to be performed by the cloud-based communication platform 108. For example, a customer may provide a set of communication instructions dictating actions to be performed by the cloud-based communication platform 108 in response to receiving an incoming communication request (e.g., incoming call) directed to an endpoint (e.g., phone number) allocated to the customer's account, such as directing the incoming communication to a specified client device 102, initiating a specified service, and the like. As another example, the set of communication instructions may include commands to transmit notifications to a specified destination or initiating a service in relation to an established communication session.

The set of communication instructions may be a programming script that the cloud-based communication platform 108 executes to perform the functionality desired by the customer. The programming script may be written in a proprietary scripting language (e.g., TwiML) provided by the cloud-based communication platform 108 for use by its customers. Alternatively, the programming script may be a third-party scripting language. In either case, the cloud-based communication platform 108 may provide an API and/or programming library defining specific commands that can be used by customers for invoking a set of features and functionality provided by the cloud-based communication platform 108. Accordingly, a customer of the cloud-based communication platform 108 uses the scripting language to generate a set of communication instructions to cause the cloud-based communication platform 108 to perform the specified actions desired by the customer, such as connecting an incoming communication to a specified destination client device 102, invoking a feature provided by the cloud-based communication platform 108, and the like.

As part of its provided communication services, the cloud-based communication platform 108 provides its customers with the ability to allocate endpoints (e.g., phone numbers, messenger accounts, etc.) from multiple jurisdictions to their individual accounts. An endpoint is a communication endpoint that facilitates communication with other endpoints in a communication network. One example of an endpoint is a phone number that allows for incoming and outgoing communication to other endpoints (e.g., phones) in a communication network. As another example, an endpoint is an account for an instant messenger application that allows for incoming and outgoing communication to other endpoints (e.g., instant messaging accounts) in the communication network. A jurisdiction is an entity (e.g., country, company, governing body, etc.) that maintains control over a set of endpoints and/or a specific communication network. For example, a jurisdiction may be a country or governing body of the country that controls phone numbers associated with a particular country calling code. As another example, a jurisdiction may be a company that provides an instant messaging application (e.g., Facebook).

The cloud-based communication platform 108 includes a multi-jurisdictional endpoint allocation system 112 that facilitates allocation of endpoints to accounts/customers of the cloud-based communication platform 108. Allocating an endpoint to an account provides the account with use of the endpoint. The multi-jurisdictional endpoint allocation system 112 receives allocation requests from client devices 102, 104 to allocate endpoints to accounts of the cloud-based communication platform 108. Each allocation request may identify the account to which the endpoint is to be allocated as well as a jurisdiction of the endpoint to be allocated to the account. For example, an allocation request may request that a phone number in Germany be allocated to a specified customer account.

In response to receiving an allocation request, the multi-jurisdictional endpoint allocation system 112 selects an available endpoint in the selected jurisdiction to allocate to the account. For example, the multi-jurisdictional endpoint allocation system 112 maintains a database of available endpoints in different jurisdictions. The multi-jurisdictional endpoint allocation system 112 searches the database of available endpoints for an available endpoint in the selected jurisdiction. Once an endpoint has been selected, the multi-jurisdictional endpoint allocation system 112 allocates the selected endpoint to the account. That is, the multi-jurisdictional endpoint allocation system 112 updates an account profile of the account to indicate that the endpoint has been allocated to the account. The multi-jurisdictional endpoint allocation system 112 may additionally update the database of available endpoints to indicate that the selected endpoint has been allocated to a customer account and thus is no longer available to be allocated elsewhere.

As explained earlier, each jurisdiction is governed by unique compliance regulations and procedures that dictate actions to be performed to successfully allocate an endpoint in the given jurisdiction. For example, one country may require that a certain set of forms be filled out and submitted when allocating an endpoint within the jurisdiction, while another country may require a different set of forms. As another example, one jurisdiction may require that populated forms be submitted via mail, while another jurisdiction may require that the forms be populated and submitted online. Manually complying with the unique requirements of each jurisdiction is a daunting and error prone task.

To alleviate this issue, the multi-jurisdictional endpoint allocation system 112 automates the compliance process. For example, the multi-jurisdictional endpoint allocation system 112 maintains a regulation database that includes a separate set of compliance regulations for each jurisdiction in which the multi-jurisdictional endpoint allocation system 112 facilitates endpoint allocation.

The set of compliance regulations for a jurisdiction can be defined as a regulation data object ("regulation object"). Each regulation object may define a set of individual jurisdictional requirements for complying with the associated set of compliance regulations for the jurisdiction. For example, a jurisdictional requirement may include providing a name to be associated with the allocated endpoint, such as a human user's name and/or fictitious business name associated with the customer to which the endpoint is being allocated. Each jurisdictional requirement may further be associated with one or more supporting proof items that satisfy the jurisdictional requirement. For example, a jurisdictional requirement for providing a name may be associated with supporting proof items such as a passport, driver's license, or other type of government issued identifier that includes a matching name.

Each regulation object may further be associated with a set of actions to be performed such as, populating certain forms, submitting the populated forms in a defined manner, etc. When a customer submits a request to allocate an endpoint in a given jurisdiction to their account, the multi-jurisdictional endpoint allocation system 112 accesses the regulation object and performs the corresponding actions to satisfy the individual jurisdictional requirements for the given jurisdiction.

Some of the actions may be executed by the multi-jurisdictional endpoint allocation system 112 without user intervention. For example, the multi-jurisdictional endpoint allocation system 112 may be able to populate and submit forms in some jurisdictions without user intervention. Some actions, however, may require some human intervention. For example, some jurisdictions may require that physical signatures be provided on forms and/or that physical copies of the forms be provided via mail. In these types of situations, the multi-jurisdictional endpoint allocation system 112 may perform the actions by generating instructions and/or a workflow that identifies the actions to be performed by a user to satisfy the jurisdictional requirements. The multi-jurisdictional endpoint allocation system 112 may then provide the instructions and/or workflow to a designated user or users of the associated customer. The actions performed by the user may be in conjunction with actions performed by the multi-jurisdictional endpoint allocation system 112. For example, the multi-jurisdictional endpoint allocation system 112 may populate a form and provide the form to a designated human user along with instructions on how to complete and properly submit the form, such as by signing the form and mailing a physical copy to a specified address.

In some embodiments, the actions associated with a regulation object may include sets of actions designated to be performed by different roles of users. For example, a set of actions may be designated to be performed by a user in an administrator role, a user in a reviewer role, a customer role, and the like. In this type of embodiment, the multi-jurisdictional endpoint allocation system 112 performs the set of actions defined for each role. For example, the multi-jurisdictional endpoint allocation system 112 may prompt a user in one role to provide specified data, populate a form based on the provided data, and then provide the populated form to a user in a different role for signature and submission.

In some embodiments, the multi-jurisdictional endpoint allocation system 112 may allow customers to customize the actions performed by the multi-jurisdictional endpoint allocation system 112 when endpoints are allocated to their account. For example, some customers may wish to add additional steps to the compliance process that are not necessarily required to satisfy the jurisdictional requirements of the jurisdiction, such as providing populated forms for review, sending notifications to internal users, etc. The multi-jurisdictional endpoint allocation system 112 may maintain a set of customer actions for each account indicating any additional actions that the customer has requested to be performed when allocating endpoints to the customer's account.

One advantage of maintaining a regulation database with regulation objects for each jurisdiction is that updates can be made quickly and seamlessly when a jurisdiction modifies their jurisdictional requirements. For example, the multi-jurisdictional endpoint allocation system 112 simply updates the regulation object and corresponding actions for the jurisdiction in the regulation database to account for changes to the jurisdictional requirements. Once updated, the multi-jurisdictional endpoint allocation system 112 performs subsequent compliance processes for the jurisdiction based on the updated regulation object and corresponding actions.

The multi-jurisdictional endpoint allocation system 112 may also perform a compliance check to determine whether customers that have endpoints from the jurisdiction allocated to their account are in compliance with the updated jurisdictional requirements. For example, the multi-jurisdictional endpoint allocation system 112 may access data bundles associated with the endpoints that identify the data and documentation used to satisfy the jurisdictional requirements when the endpoint was allocated to the account. The multi-jurisdictional endpoint allocation system 112 may check whether the previously submitted data satisfies the updated jurisdictional requirements. In the event that the updated jurisdictional requirements are not satisfied, the multi-jurisdictional endpoint allocation system 112 may reinitiate the compliance process for those endpoints based on the updated regulation object.

Figure 2:
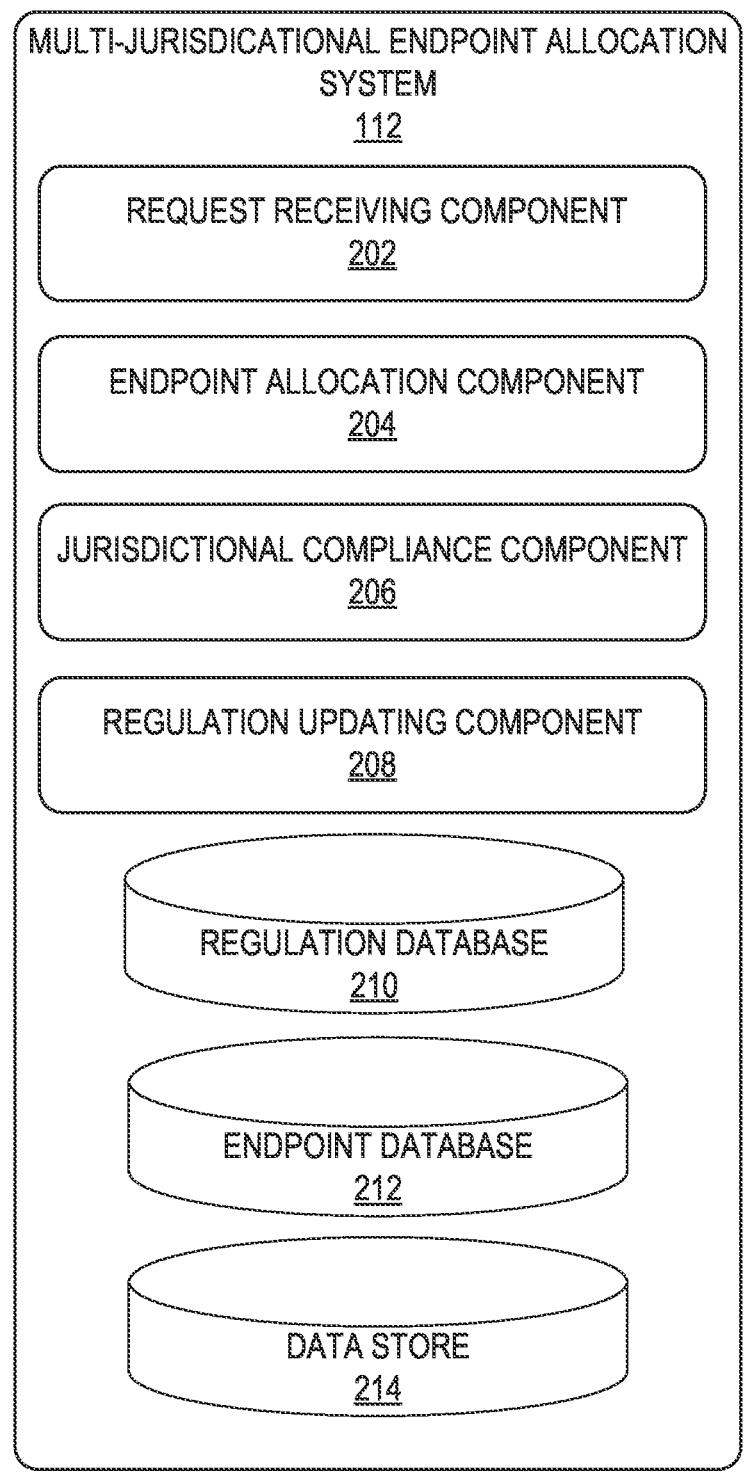
FIG. 2 is a block diagram of a multi-jurisdictional endpoint allocation system, according to some example embodiments.

FIG. 2 is a block diagram of a multi-jurisdictional endpoint allocation system 112, according to some example embodiments. To avoid obscuring the inventive subject matter with unnecessary detail, various functional components (e.g., components) that are not germane to conveying an understanding of the inventive subject matter have been omitted from FIG. 2. However, a skilled artisan will readily recognize that various additional functional components may be supported by the multi-jurisdictional endpoint allocation system 112 to facilitate additional functionality that is not specifically described herein. Furthermore, the various functional components depicted in FIG. 2 may reside on a single computing device or may be distributed across several computing devices in various arrangements such as those used in cloud-based architectures.

As shown, the multi-jurisdictional endpoint allocation system 112 includes a request receiving component 202, an endpoint allocation component 204, a jurisdictional compliance component 206, an regulation updating component 208, a regulation database 210, an endpoint database 212, and a data store 214.

The request receiving component 202 receives allocation requests to allocate endpoints to accounts of the cloud-based communication platform 108. The allocation requests may be received from the customer computing system 106, client devices 102, 104, and/or from the cloud-based communication platform 108. Each allocation request may include data identifying the account to which the endpoint is to be allocated. For example, an allocation request may include a unique account identifier associated with the account or corresponding customer. An allocation request may also include data identifying the jurisdiction of the endpoint to be allocated to the account. For example, the allocation request may include an identifier, value or other metadata identifying the jurisdiction.

The endpoint allocation component 204 allocates endpoints to accounts of the cloud-based communication platform 108. For example, the endpoint allocation component 204 identifies an available endpoint in the selected jurisdiction. An available endpoint is an endpoint managed by the cloud-based communication platform 108 that is not currently allocated to an account of the cloud-based communication platform 108.

The endpoint database 212 maintains a listing of the available endpoints managed by the cloud-based communication platform 108. The endpoint allocation component 204 communicates with the endpoint database 212 to identify an available endpoint in the selected jurisdiction. For example, the endpoint allocation component 204 searches the endpoint database 212 based on an identifier (e.g., country code) associated with the jurisdiction to identify available endpoints within the jurisdiction. The endpoint allocation component 204 then selects one of the identified available endpoints to allocate to the account.

To allocate the selected endpoint to the account, the endpoint allocation component 204 accesses account profile data for the account from the data store 214. The endpoint allocation component 204 updates the account profile data to indicate that the endpoint has been allocated to the account. The endpoint allocation component 204 may also update the endpoint database 212 to indicate that the selected endpoint has been allocated to an account and is therefore not available to be allocated to another account.

The jurisdictional compliance component 206 automates the compliance process for an allocated endpoint. For example, the jurisdictional compliance component 206 uses a regulation object defining a set of individual jurisdictional requirements for complying with regulations for the jurisdiction. The jurisdictional compliance component 206 accesses the regulation object for a jurisdiction from the regulation database 210. For example, the jurisdictional compliance component 206 searches the regulation database 210 based on a unique identifier or country code associated with the jurisdiction to identify the corresponding regulation object.

Each regulation object may define a set of individual jurisdictional requirements for complying with the associated set of compliance regulations for the jurisdiction. For example, a jurisdictional requirement may include providing a name to be associated with the allocated endpoint, such as a human user's name and/or fictitious business name associated with the customer to which the endpoint is being allocated. Each jurisdictional requirement may further be associated with one or more supporting proof items that satisfy the jurisdictional requirement. For example, a jurisdictional requirement for providing a name may be associated with supporting proof items such as a passport, driver's license, of other type of government issued identifier that includes a matching name.

Figure 3:
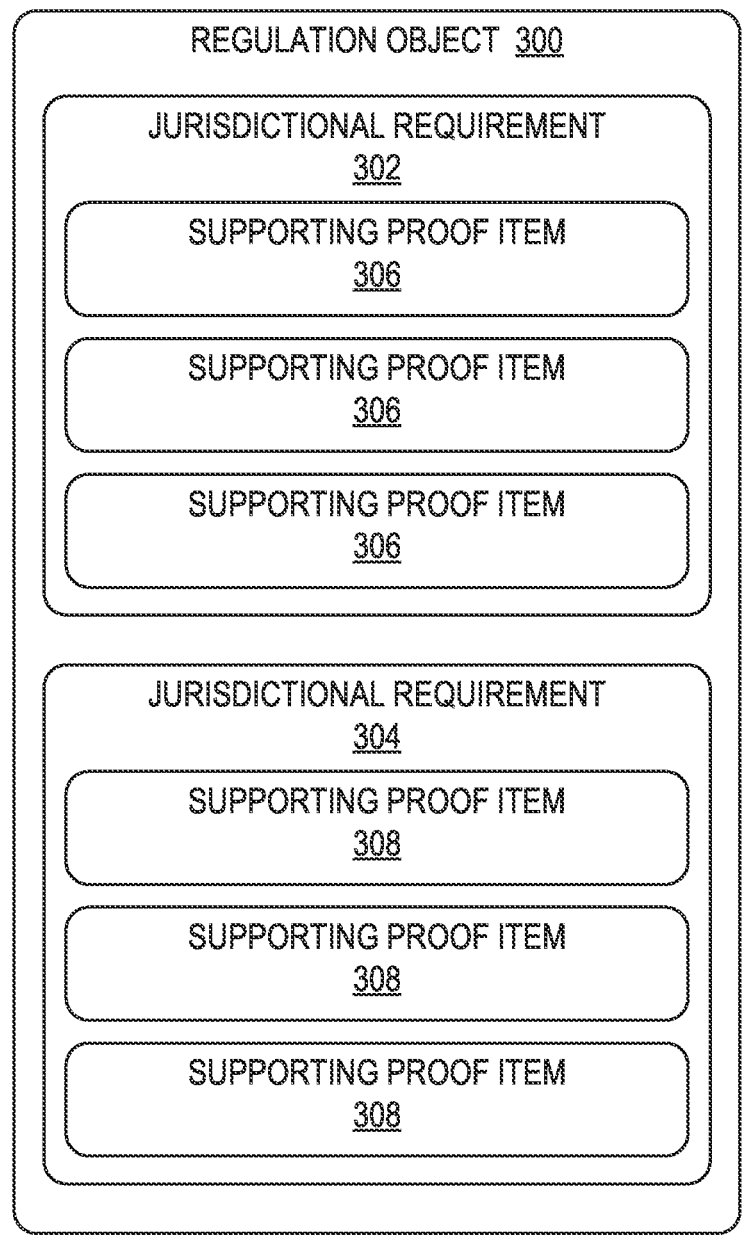
FIG. 3 illustrates a regulation data object, according to some example embodiments.

FIG. 3 illustrates a regulation data object 300, according to some example embodiments. As shown, the regulation data object 300 includes two jurisdictional requirements (e.g., jurisdictional requirement 1 302 and jurisdictional requirement 2 304), which are each associated with multiple supporting proof items 306, 308. Each jurisdictional requirement 302, 304 may identify an individual requirement for complying with the jurisdictional regulations in the jurisdiction. For example, the jurisdictional requirements 302, 304 may include providing a name, address, and the like, associated with the customer to which the endpoint will be allocated.

The supporting proof items 306, 308 associated with each jurisdictional requirement 302, 304 identify types of data that can be provided to satisfy the corresponding jurisdictional requirement 302, 304. For example, one jurisdictional requirement 302 may be to provide a name associated with the customer and another jurisdictional requirement 304 may be to provide an address associated with the customer. In this example, the supporting proof items 306 for the jurisdictional requirement 302 of providing a name may include a passport or driver's license that includes the provided name. Similarly, the supporting proof items 308 for the jurisdictional requirement 304 of providing an address may include a lease, title, or utility bill that includes the address.

Returning to the discussion of FIG. 2, each regulation object may further be associated with a set of actions to be performed such as, populating certain forms, submitting the populated forms in a defined manner, etc. When a customer submits a request to allocate an endpoint in a given jurisdiction to their account, the jurisdictional compliance component 206 accesses the regulation object and performs the corresponding actions to satisfy the individual jurisdictional requirements for the given jurisdiction. The functionality of the jurisdictional compliance component 206 is described in greater detail in relation to FIGS. 4, 5, 8 and 10.

The regulation updating component 208 updates regulations for a given jurisdiction. One advantage of maintaining a regulation database 210 with regulation objects for each jurisdiction is that updates can be made quickly and seamlessly when a jurisdiction modifies their jurisdictional requirements. For example, the regulation updating component 208 simply accesses the regulation object from the regulation database 210 and updates the regulation object and corresponding actions to reflect the changes to the jurisdictional requirements for the jurisdiction. Once the regulation object is updated, the jurisdictional compliance component 206 performs subsequent compliance processes for the jurisdiction based on the updated regulation object and corresponding actions.

The regulation updating component 208 may also perform a compliance check to determine whether customers that have endpoints from the jurisdiction allocated to their account are in compliance with the updated jurisdictional requirements. For example, the regulation updating component 208 may access data bundles associated with the endpoints that identify the data and documentation used to satisfy the jurisdictional requirements when the endpoint was allocated to the account. The regulation updating component 208 may check whether the previously submitted data satisfies the updated jurisdictional requirements. In the event that the updated jurisdictional requirements are not satisfied, the regulation updating component 208 may cause the jurisdictional compliance component 206 to reinitiate the compliance process for those endpoints based on the updated regulation object. The functionality of the regulation updating component 208 is described in greater detail below in relation to FIGS. 7, 9 and 11.

Figure 4:
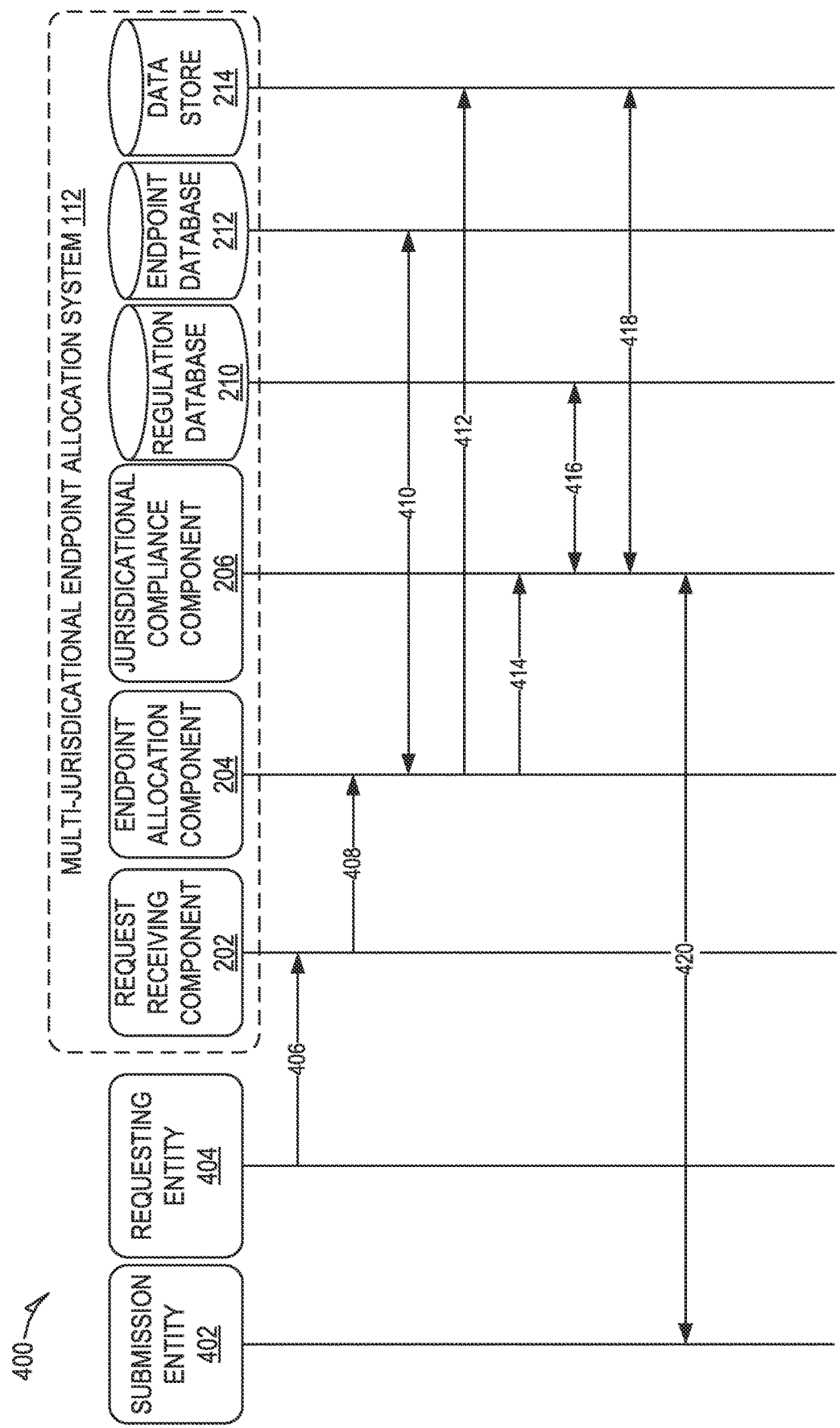
FIG. 4 illustrates communications for multi-jurisdictional endpoint allocation compliance, according to some example embodiments.

FIG. 4 illustrates communications for multi-jurisdictional endpoint allocation compliance, according to some example embodiments. As shown, the system 400 includes a submission entity 402, a requesting entity 404, and a multi-jurisdictional endpoint allocation system 112. The multi-jurisdictional endpoint allocation system 112 includes a request receiving component 202, an endpoint allocation component 204, a jurisdictional compliance component 206, a regulation database 210, an endpoint database 212, and a data store 214.

The requesting entity transmits an allocation request 406 to the multi-jurisdictional endpoint allocation system 112. The requesting entity 404 may be any of a variety of entities or devices, such as a client device 102, a customer computing system 106, or the cloud-based communication platform 108.

The allocation request 406 requests that an endpoint be allocated to an account of the cloud-based communication platform 108. The allocation request 406 may include data identifying the account and/or the desired jurisdiction of the endpoint to be allocated to the account. For example, the allocation request 406 may include a unique identifier associated with the account and/or a unique identifier or country code associated with the desired jurisdiction.

The request receiving component 202 receives the allocation request 406 from the requesting entity 404 and provides an instruction 408 to the endpoint allocation component 204 to allocate an endpoint based on the allocation request 406, example, the instruction 408 includes data identifying the number of endpoints to allocate, the jurisdiction from which the endpoints are to be allocated, the account to which the endpoints are to be allocated, and the like.

In response to receiving the instruction 408, the endpoint allocation component 204 communicates 410 with the endpoint database 212 to identify an available endpoint in the desired jurisdiction. The endpoint database 212 maintains a listing of the available endpoints managed by the cloud-based communication platform 108. During communications 410 with the endpoint database 212, the endpoint allocation component 204 searches for available endpoints in the jurisdiction listed in the endpoint database 212 and selects one of identified endpoints to allocate to the account. The endpoint allocation component 204 may also update the endpoint database 212 to indicate that the selected endpoint is no longer available to be allocated to other accounts.

To allocate the selected endpoint to the account, the endpoint allocation component 204 communicates 412 with the data store 214 to update the account profile of the account. For example, the endpoint allocation component 204 updates the account profile to indicate that the endpoint is allocated to the account. The endpoint allocation component 204 also instructs 414 the jurisdictional compliance component 206 to initiate the compliance process for the allocated endpoint. The instruction 414 may include data identifying the jurisdiction and the account.

To initiate the compliance process, the jurisdictional compliance component 206 communicates 416 with the regulation database 210 to access the regulation object associated with the jurisdiction. The jurisdictional compliance component 206 also gathers any data needed to perform the compliance process, such as data or forms needed to perform the compliance process for the jurisdiction. For example, the jurisdictional compliance component 206 communicates 418 with the data store 214 to access the forms, data, and the like. As another example, the jurisdictional compliance component 206 may include links or other data identifying the location of forms or other data needed to perform the compliance process. The jurisdictional compliance component 206 may use the links or other data to access the data or forms from the specified locations.

As part of the communications 418 with the data store, the jurisdictional compliance component 206 may also access account data needed to perform the compliance process. This may include data associated with the customer that is needed to populate forms or other documents. This data may also include data identifying users associated with the account that are assigned to various roles (e.g., administrator, employee, reviewer, etc.) as well as any account specific customer actions to be performed.

In some embodiments, the jurisdictional compliance component 206 may access data from users associated with the customer or account. For example, the jurisdictional compliance component 206 may communicate with client devices 102 (not shown) of the users to prompt the users for specified data. The jurisdictional compliance component 206 uses the accessed data to perform the compliance process based on regulation object and the gathered data. For example, the jurisdictional compliance component 206 may perform actions associated with the regulation object, such as populating forms, generating workflows, generating instructions, etc. The jurisdictional compliance component 206 may provide the resulting instructions, workflows, forms, etc., to the appropriate users, such as by communicating with client devices 102, 104, of the users and/or the customer computing system 106.

The jurisdictional compliance component 206 may also submit any populated forms by communicating 420 with a submission entity 402 associated with the jurisdiction. The submission entity 402 may be any type of entity to which a form or other data may be submitted to a governing body of a jurisdiction. For example, the submission entity 402 may be a website through which a populated form may be submitted. As another example, the submission entity 402 may be an email address to which a populated form may be submitted. While the system 400 shows only one submission entity 402, this is only for ease of explanation and is not meant to be limiting. The system 400 may include any number of submission entities 402 and the jurisdictional compliance component 206 may communicate with one or more submission entities 402 during the compliance process.

Figure 5:
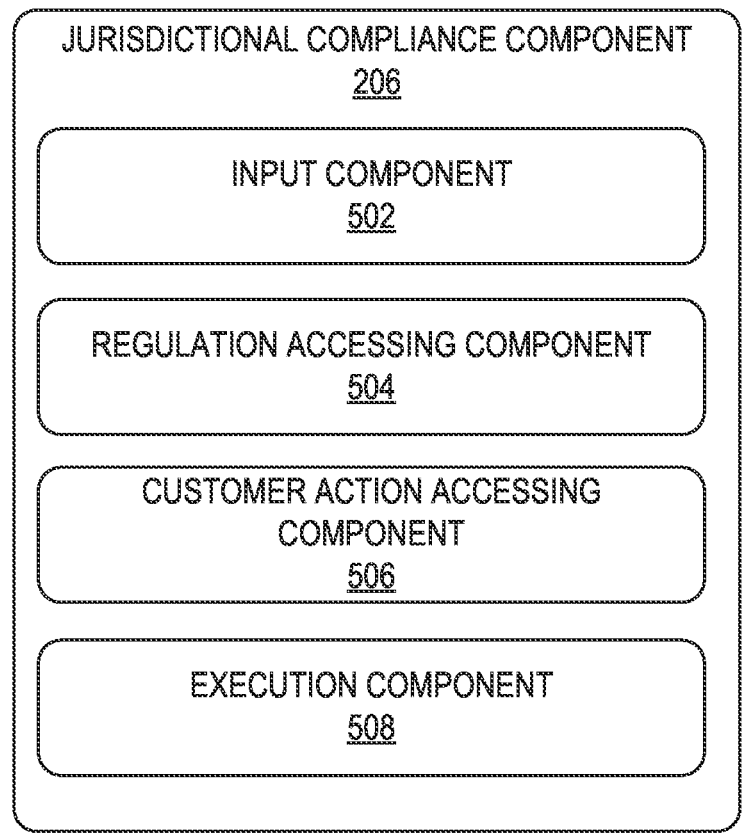
FIG. 5 is a block diagram of a jurisdictional compliance component, according to some example embodiments.

FIG. 5 is a block diagram of a jurisdictional compliance component 206, according to some example embodiments. To avoid obscuring the inventive subject matter with unnecessary detail, various functional components (e.g., components) that are not germane to conveying an understanding of the inventive subject matter have been omitted from FIG. 5. However, a skilled artisan will readily recognize that various additional functional components may be supported by the jurisdictional compliance component 206 to facilitate additional functionality that is not specifically described herein. Furthermore, the various functional components depicted in FIG. 5 may reside on a single computing device or may be distributed across several computing devices in various arrangements such as those used in cloud-based architectures.

As shown, the jurisdictional compliance component 206 includes an input component 502, a regulation accessing component 504, a customer action accessing component 506, and an execution component 508.

The input component 502 receives requests to initiate the compliance process for an allocated endpoint. For example, the input component 502 may receive the request from the endpoint allocation component 204 upon an endpoint being allocated to an account of the cloud-based communication platform 108. The request may include data identifying the jurisdiction and the account, such as a unique identifier and/or country code associated with the jurisdiction and a unique account identifier associated with the account.

The input component 502 may communicate with the other components of the jurisdictional compliance component 206 to initiate the compliance process for an allocated endpoint. For example, the input component 502 may provide the regulation accessing component 504 with data identifying the jurisdiction of the allocated endpoint and provide the customer action accessing component 506 with data identifying the account to which the endpoint has been allocated.

The regulation accessing component 504 uses the data identifying the jurisdiction to access the corresponding regulation object from the regulation database 210. For example, the regulation accessing component 504 uses the unique identifier and/or country code associated with the jurisdiction to search the regulation databased 210 for the corresponding regulation object. The regulation accessing component 504 may provide the accessed regulation object and corresponding actions to the execution component 508.

The customer action accessing component 506 accesses data identifying any additional customer actions requested by a customer when performing the compliance process for endpoints allocated to the customer's account. As explained earlier, customers of the cloud-based communication platform 108 may wish to customize the actions performed by the multi-jurisdictional endpoint allocation system 112 when endpoints are allocated to their account. For example, some customers may wish to add additional steps to the compliance process that are not necessarily required to comply with the jurisdictional requirements of the jurisdiction, such as providing populated forms for review, sending notifications to internal users, etc.

Figure 6:
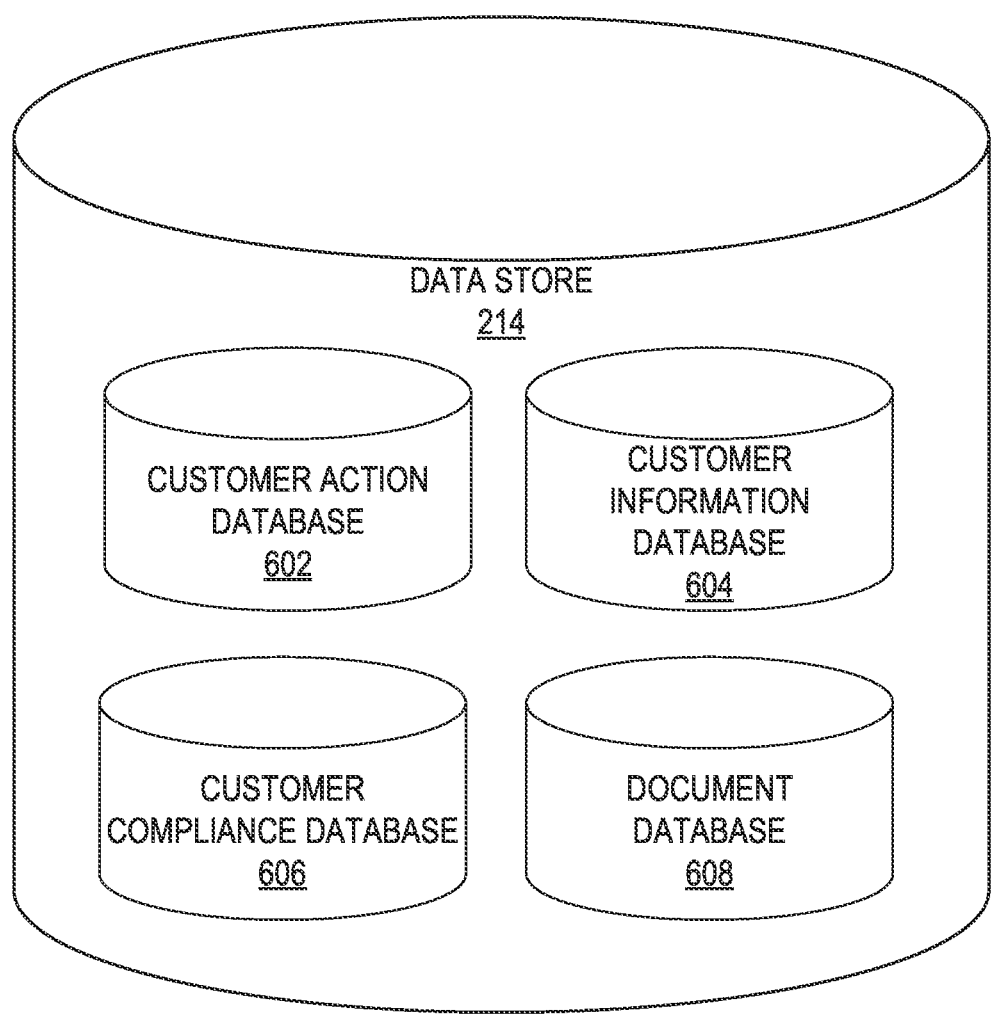
FIG. 6 is a block diagram of a data store, according to some example embodiments.

The customer action accessing component 506 accesses data identifying the customer specified actions based on the account identifier associated with the account. As shown in FIG. 6, the data store 214 may include a customer action database 602, which is used to store data identifying the customer specified actions. Accordingly, the customer action accessing component 506 uses the unique account identifier associated with the user account to search the customer action database 602 and access the customer specified actions, if any. The customer action accessing component 506 may provide data identifying the customer specified actions to the execution component 508. Alternatively, if a customer has not specified that any additional customer actions be performed (e.g., the search of the customer action database 602 does not return any customer actions), the customer action accessing component 506 may notify the execution component 508 that additional customer actions have not been established.

The execution component 508 executes actions to automate the process of complying with the jurisdictional requirements of a jurisdiction. For example, the execution component 508 may execute the actions associated with the regulation object to perform the compliance process. This may include accessed needed data, populating forms, generating worklists for users of the customer, and the like. As shown, the data store 214 includes a document database 608 that stores forms, workflow templates, instructions, and the like, for complying with the jurisdictional requirements for given jurisdictions. The execution component 508 may access these forms, workflow templates, and the like, from the document database 608, which are used during the compliance process.

In some embodiments, the execution component 508 gathers data to populate forms documents (e.g., forms, workflows) gathered from the customer information database 604. The execution component 508 can use the regulation object to identify the supporting proof item that will satisfy the jurisdictional requirements for the jurisdiction, which may be needed when populating a document. The execution component 508 may be able to access some of the needed data locally. For example, a customer may have provided a variety of supporting proof items to the multi-jurisdictional endpoint allocation system 112, which the execution component 508 may use to satisfy jurisdictional requirements of the jurisdiction. As shown in FIG. 6, the data store 214 may include a customer information database 604 that stores data provided and associated with the customer. For example, the customer information database 604 may include supporting proof items, such as copies of passports, government issued identifiers, and the like. The customer information database 604 may also include data identifying addresses of the customer, names of users, contact information, and the like.

The execution component 508 may search the customer information database 604 for data associated with the customer to satisfy the jurisdictional requirements. For example, the data stored in the customer information database 604 may be associated with identifiers indicating a type of the data, such as an identifier identifying a data item as being a copy of passport or an address associated with a corporate office in the jurisdiction. The supporting proof items identified in the regulation object may similarly be associated with identifiers indicating a type of the supporting data item. The execution component 508 may use the identifiers associated with the supporting data items listed in the regulation object to search for data items stored in the customer information database 604 that have a matching identifier, indicating that the data item is the supporting data items to satisfy the corresponding jurisdictional requirement.

Alternatively, the execution component 508 may request data from customers, such as by transmitting messages to specified users for the needed data items. As another example, the execution component 508 may generate workflows that are provided to the customer, which identify steps/action to be performed by the customer. This may include providing the specified data items to the multi-jurisdictional endpoint allocation system 112 and/or submitting specified forms, documents and/or data to a specified entity.

Some of the actions may be executed by execution component 508 without user intervention. For example, the execution component 508 may be able populate and submit forms in some jurisdictions without user intervention. Some actions, however, may require some human intervention. For example, some jurisdictions may require that physical signatures be provided on forms and/or that physical copies of the forms be provided via mail. In these types of situations, the execution component 508 may perform the actions by generating instructions and/or a workflow that identifies the actions to be performed by a user to satisfy the jurisdictional requirements. The execution component 508 may then provide the instructions and/or workflow to a designated user or users of the associated customer. The actions performed by the user may be in conjunction with actions performed by the execution component 508. For example, the execution component 508 may populate a form and provide the form to a designated human user along with instructions on how to complete and properly submit the form, such as by signing the form and mailing a physical copy to a specified address.

In some embodiments, the actions associated with a regulation object may include sets of actions designated to be performed by different roles of users. For example, a set of actions may be designated to be performed by a user in an administrator role, a user in a reviewer role, a customer role, and the like. In this type of embodiment, the execution component 508 performs and/or coordinates the set of actions defined for each role. For example, the execution component 508 may prompt a user in one role to provide specified data, populate a form based on the provided data, and then provide the populated form to a user in a different role for signature and submission.

The execution component 508 may generate data bundles that include and/or identify the data and documentation used to satisfy the jurisdictional requirements for an allocated endpoint. The data bundles can be associated with the endpoint and used to provide documentation of compliance with the jurisdictional requirements and/or to check compliance in the event that the jurisdictional requirements are updated. As shown in FIG. 6, the data store 214 includes a customer compliance database 606 that stores the data bundles generated by the execution component 508. The data bundles stored in the customer compliance databased 606 are associated with the corresponding endpoint to allow for the data bundles for each endpoint to be easily identified.

FIG. 6 is a block diagram of a data store 214, according to some example embodiments. To avoid obscuring the inventive subject matter with unnecessary detail, various functional components (e.g., components) and databases that are not germane to conveying an understanding of the inventive subject matter have been omitted from FIG. 6. However, a skilled artisan will readily recognize that various additional functional components and databases may be supported by the data store 214 to facilitate additional functionality that is not specifically described herein. Furthermore, the various functional components and databases depicted in FIG. 6 may reside on a single computing device or may be distributed across several computing devices in various arrangements such as those used in cloud-based architectures.

As shown, the data store 214 includes customer action database 602, a customer information database 604, a customer compliance database 606, and a document database 608. The customer action database 602 stores customer specified actions provided by a customer, some customers may wish to add additional steps to the compliance process that are not necessarily required to comply with the jurisdictional requirements of the jurisdiction, such as providing populated forms for review, sending notifications to internal users, and the like. The customer may provide data identifying the customer specified action to the multi-jurisdictional endpoint allocation system 112, which are then stored in the customer action database 602.

The customer information database 604 stores data provided and associated with the customer, which may be used during the jurisdictional compliance process. For example, a customer may have provided a variety of supporting proof items to the multi-jurisdictional endpoint allocation system 112, which are stored in the customer information database 604. For example, the customer information database 604 may include supporting proof items, such as copies of passports, government issued identifiers, and the like. The customer information database 604 may also include data identifying addresses of the customer, names of users, contact information, and the like. The data items stored in the customer information database 604 may be associated with identifiers indicating the type of data items, such as whether the data item is a copy of a passport, driver's license, and the like.

The customer compliance database 606 stores data bundles that include and/or identify the data and documentation used to satisfy the jurisdictional requirements for an allocated endpoint. The data bundles stored in the customer compliance database 606 can be associated with the corresponding endpoint to provide documentation of compliance with the jurisdictional requirements and/or to check compliance in the event that the jurisdictional requirements are updated.

The document database 608 stores forms, workflow templates, instructions, and the like, that are used for complying with the jurisdictional requirements for given jurisdictions. The data stored in the document database 608 may be associated with data identifying the jurisdiction to which it applies. For example, forms and workflow templates may be associated with unique identifiers and/or country codes identifying the corresponding jurisdiction.

Figure 7:
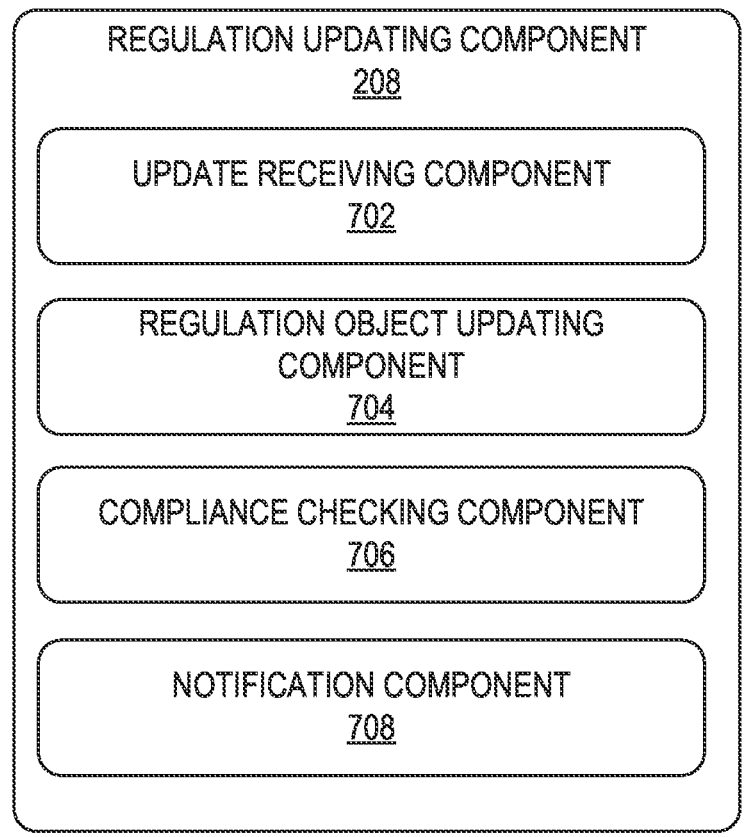
FIG. 7 is a block diagram of a regulation updating component, according to some example embodiments.

FIG. 7 is a block diagram of a regulation updating component 208, according to some example embodiments. To avoid obscuring the inventive subject matter with unnecessary detail, various functional components (e.g., components) that are not germane to conveying an understanding of the inventive subject matter have been omitted from FIG. 7. However, a skilled artisan will readily recognize that various additional functional components may be supported by the regulation updating component 208 to facilitate additional functionality that is not specifically described herein. Furthermore, the various functional components depicted in FIG. 7 may reside on a single computing device or may be distributed across several computing devices in various arrangements such as those used in cloud-based architectures.

As shown, the regulation updating component 208 includes an update receiving component 702, a regulation object updating component 704, a compliance checking component 706, and a notification component 708.

The update receiving component 702 receives a request to update the jurisdictional requirements for a jurisdiction. A request may be received from a client device 102, such as a client device 102 associated with an administrator or other authorized user of the cloud-based communication platform 108 and/or multi-jurisdictional endpoint allocation system 112. As another example, the request may be received from a client device 102 of a user associated with the jurisdiction, such as the governing body of the jurisdiction. The request may identify the jurisdiction, such as by including a unique identifier and/or country code for the jurisdiction. The request may also include data identifying an updated set of jurisdictional requirements and/or associated actions to be performed by the multi-jurisdictional endpoint allocation system 112 to provide compliance with the jurisdictional requirements.

The regulation object updating component 704 accesses the regulation object from the regulation database 210. For example, the regulation object updating component 704 uses the unique identifier and/or country code to identify the regulation object from the regulation database 210. The regulation object updating component 704 may then update the regulation object based on the updated set of jurisdictional requirements and/or associated actions identified in the request. The regulation object updating component 704 stores the updated regulation object in the regulation database 210, where it can be used by the other components of the multi-jurisdictional endpoint allocation system 112 to provide compliance with jurisdictional requirements in the jurisdiction.

The compliance checking component 706 performs a compliance check to determine whether customers are in compliance with the updated jurisdictional requirement for a jurisdiction. For example, the compliance checking component 706 identifies endpoints he compliance checking component 706 provides the notification component 708 with data indicating whether the endpoint does or does not comply with the updated jurisdictional requirements. In the event that the updated jurisdictional requirements are not satisfied, the notification co from the jurisdiction that have been allocated to accounts of the cloud-based communication platform 108. To determine whether the jurisdictional requirements have been satisfied for an allocated endpoint, the multi-jurisdictional endpoint allocation system 112 accesses a data bundle associated with the endpoint from the customer compliance database 606. The data bundle includes and/or identifies the data and documentation used to satisfy the jurisdictional requirements when the endpoint was allocated to the account. The compliance checking component 706 may check whether the previously submitted data satisfies the updated jurisdictional requirements.

The compliance checking component 706 provides the notification component 708 with data indicating whether the endpoint does or does not comply with the updated jurisdictional requirements. In the event that the updated jurisdictional requirements are not satisfied, the notification component 708 communicates with the jurisdictional compliance component 206 to reinitiate the compliance process for the endpoints based on the updated regulation object. The notification component 708 may also notify the customer associated with the account regarding whether the endpoint does or does not comply with the updated jurisdictional requirements.

Figure 8:
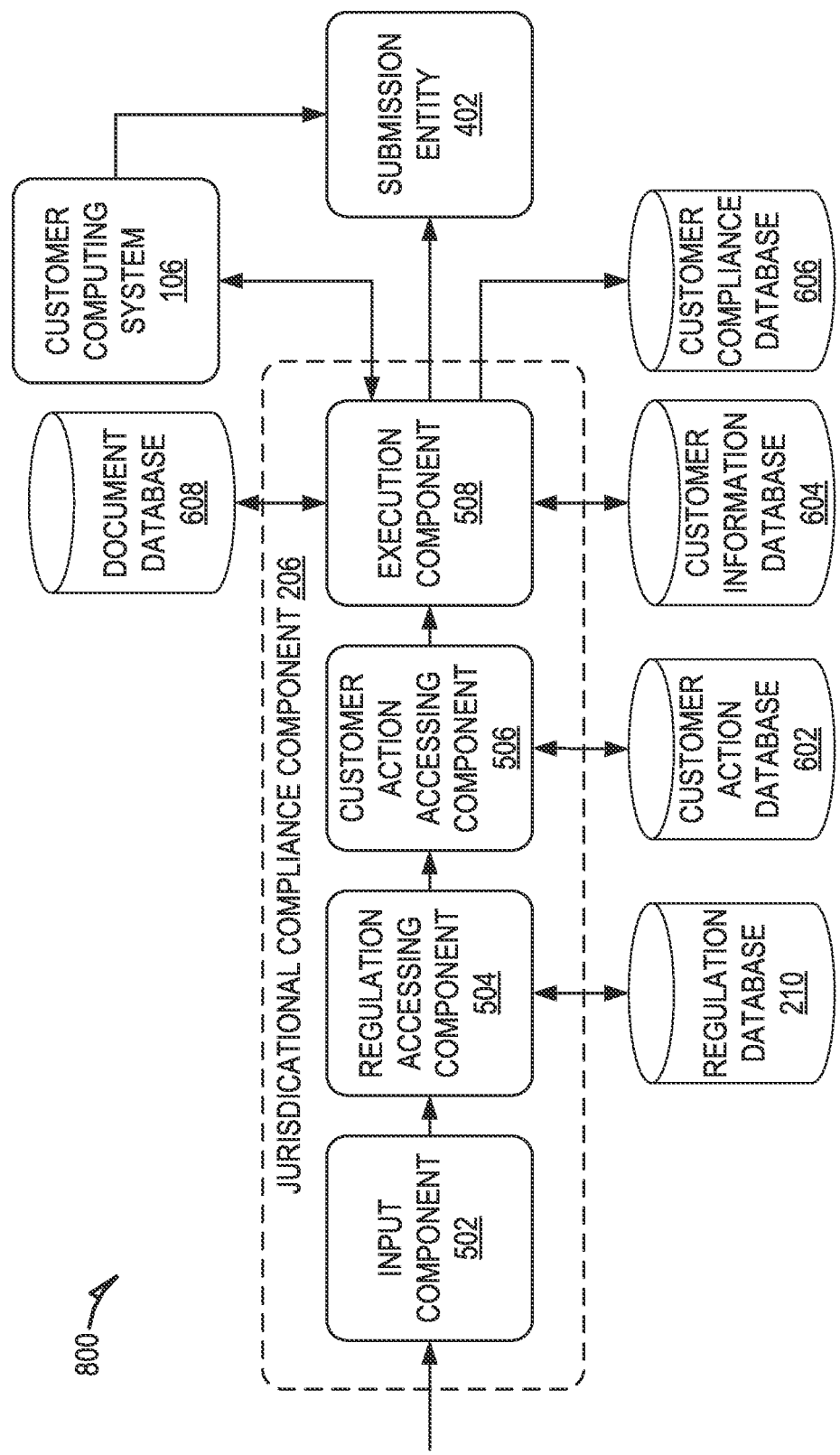
FIG. 8 illustrates communications for multi-jurisdictional endpoint allocation compliance, according to some example embodiments.

FIG. 8 illustrates communications for multi-jurisdictional endpoint allocation compliance, according to some example embodiments. As shown, the system 800 includes a jurisdictional compliance component 206, a regulation database 210, a customer action database 602, a customer information database 604, a customer compliance database 606, a document database 608, a customer computing system 106 and a submission entity 402. Further, the jurisdictional compliance component 206 includes an input component 502, a regulation accessing component 504, a customer action accessing component 506, and an execution component 508.

The input component 502 receives a request to initiate the compliance process for an allocated endpoint. For example, the input component 502 may receive the request from the endpoint allocation component 204 upon an endpoint being allocated to an account of the cloud-based communication platform 108. The request may include data identifying the jurisdiction and the account, such as a unique identifier and/or country code associated with the jurisdiction and a unique account identifier associated with the account.

The input component 502 may communicate with the other components of the jurisdictional compliance component 206 to initiate the compliance process for an allocated endpoint, such as the regulation accessing component 504 and/or the customer action accessing component 506.

The regulation accessing component 504 uses the data identifying the jurisdiction to access the corresponding regulation object from the regulation database 210. For example, the regulation accessing component 504 uses the unique identifier and/or country code associated with the jurisdiction to search the regulation databased 210 for the corresponding regulation object. The regulation accessing component 504 may provide the accessed regulation object and corresponding actions to the execution component 508.

The customer action accessing component 506 accesses data identifying any additional customer actions requested by a customer when performing the compliance process for endpoints allocated to the customer's account. As explained earlier, customers of the cloud-based communication platform 108 may wish to customize the actions performed by the multi-jurisdictional endpoint allocation system 112 when endpoints are allocated to their account. For example, some customers may wish to add additional steps to the compliance process that are not necessarily required to comply with the jurisdictional requirements of the jurisdiction, such as providing populated forms for review, sending notifications to internal users, etc.

The execution component 508 executes actions to automate the process of complying with the jurisdictional requirements of a jurisdiction. For example, the execution component 508 may execute the actions associated with the regulation object and any customized action specified by the customer. To perform the actions, the execution component 508 may communicate with the document database 608 to access any forms, documents, templates, and the like, associated with performance of the actions. The execution component 508 may also access the customer information database 604 to access data provided and/or associated with the customer to populate forms, satisfy individual jurisdictional requirements, and the like. The execution component 508 may also communicate with the customer computing system 106 to transmit notifications for specified data, provide forms to be completed by users, provide workflows or instructions to be completed, and the like. Similarly, the execution component 508 may receive data from the customer computing system 106, such as completed forms, requested data, and the like.

The execution component 508 and/or the customer computing system 106 may submit data to the submission entity 402 to comply with the jurisdictional requirements. The execution component 508 may also generate a data bundle based on the data submitted to the submission entity 402 by the execution component 508 and/or the customer computing system 106. The execution component 508 may store the data bundle in the customer compliance database 606, where it is associated with the allocated endpoint. This allows for the data bundle to be accessed later to provide verification that the jurisdictional requirements have been satisfied and/or that to determine whether updated jurisdictional requirements have been satisfied.

Figure 9:
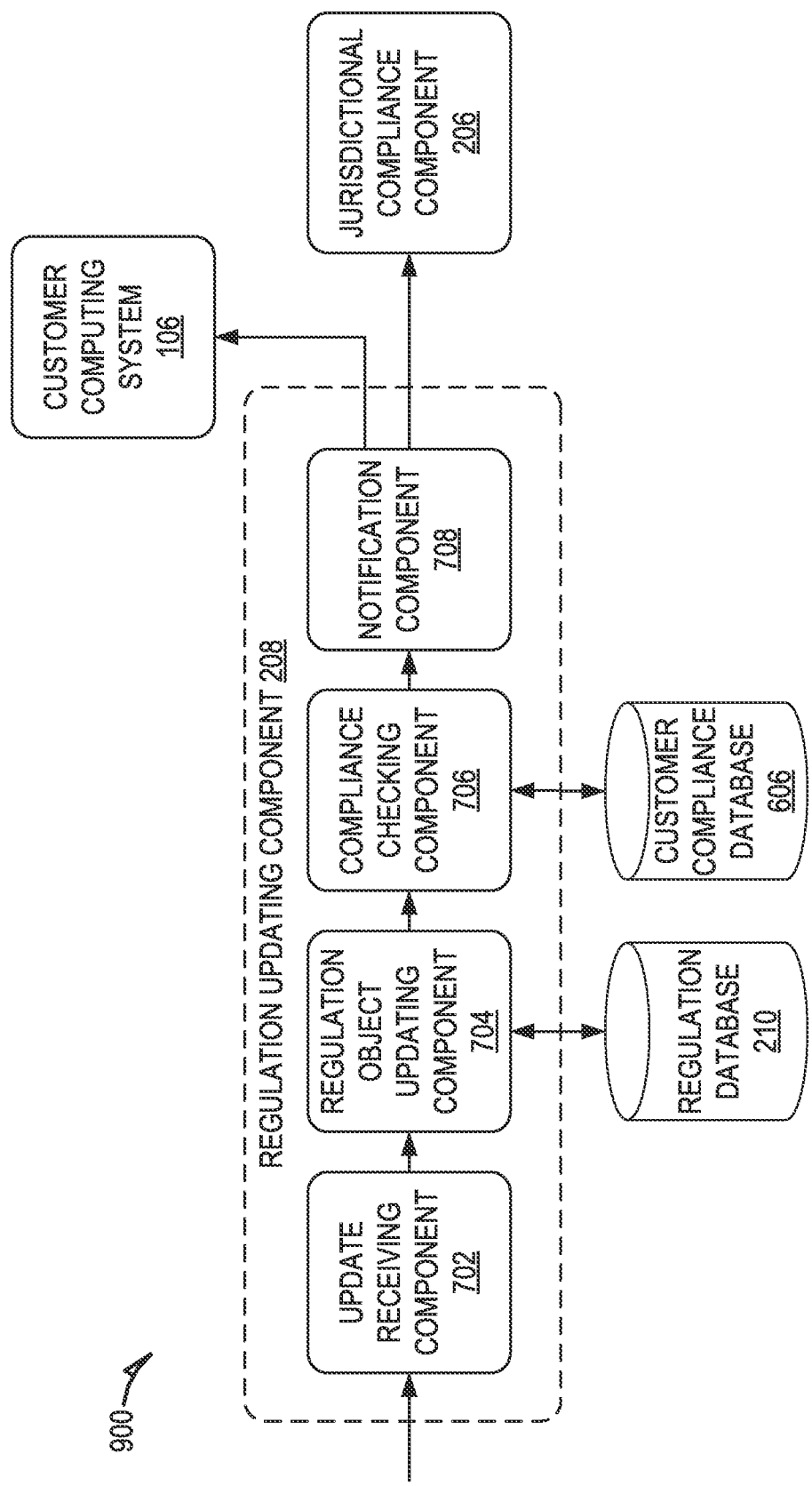
FIG. 9 illustrates communications for updating jurisdictional requirements, according to some example embodiments.

FIG. 9 illustrates communications for updating jurisdictional requirements, according to some example embodiments. As shown, the system 900 includes a regulation updating component 208, a regulation database 210, a customer compliance database 606, a customer computing system 106, and a jurisdictional compliance component 206. Further, the regulation updating component 208 includes an update receiving component 702, a regulation object updating component 704, a compliance checking component 706, and a notification component 708.

The update receiving component 702 receives a request to update the jurisdictional requirements for a jurisdiction. A request may be received from a client device 102, such as a client device 102 associated with an administrator or other authorized user of the cloud-based communication platform 108 and/or multi-jurisdictional endpoint allocation system 112. As another example, the request may be received from a client device 102 of a user associated with the jurisdiction, such as governing body of the jurisdiction. The request may identify the jurisdiction, such as by including a unique identifier and/or country code for the jurisdiction. The request may also include data identifying an updated set of jurisdictional requirements and/or associated actions to be performed by the multi-jurisdictional endpoint allocation system 112 to provide compliance with the jurisdictional requirements.

The regulation object updating component 704 accesses the regulation object from the regulation database 210. For example, the regulation object updating component 704 uses the unique identifier and/or country code to identify the regulation object from the regulation database 210. The regulation object updating component 704 may then update the regulation object based on the updated set of jurisdictional requirements and/or associated actions identified in the request. The regulation object updating component 704 stores the updated regulation object in the regulation database 210, where it can be used by the other components of the multi-jurisdictional endpoint allocation system 112 to provide compliance with jurisdictional requirements in the jurisdiction.

The compliance checking component 706 performs a compliance check to determine whether customers are in compliance with the updated jurisdictional requirement for a jurisdiction. For example, the compliance checking component 706 identifies endpoints from the jurisdiction that have been allocated to accounts of the cloud-based communication platform 108. To determine whether the jurisdictional requirements have been satisfied for an allocated endpoint, the multi-jurisdictional endpoint allocation system 112 accesses a data bundle associated with the endpoint from the customer compliance database 606. The data bundle includes and/or identifies the data and documentation used to satisfy the jurisdictional requirements when the endpoint was allocated to the account. The compliance checking component 706 may check whether the previously submitted data satisfies the updated jurisdictional requirements.

The compliance checking component 706 provides the notification component 708 with data indicating whether the endpoint does or does not comply with the updated jurisdictional requirements. In the event that the updated jurisdictional requirements are not satisfied, the notification component 708 communicates with the jurisdictional compliance component 206 to reinitiate the compliance process for the endpoints based on the updated regulation object. The notification component 708 may also notify the customer associated with the account regarding whether the endpoint does or does not comply with the updated jurisdictional requirements. For example, the notification component 708 may transmit the notification to the customer computing system 106.

Figure 10:
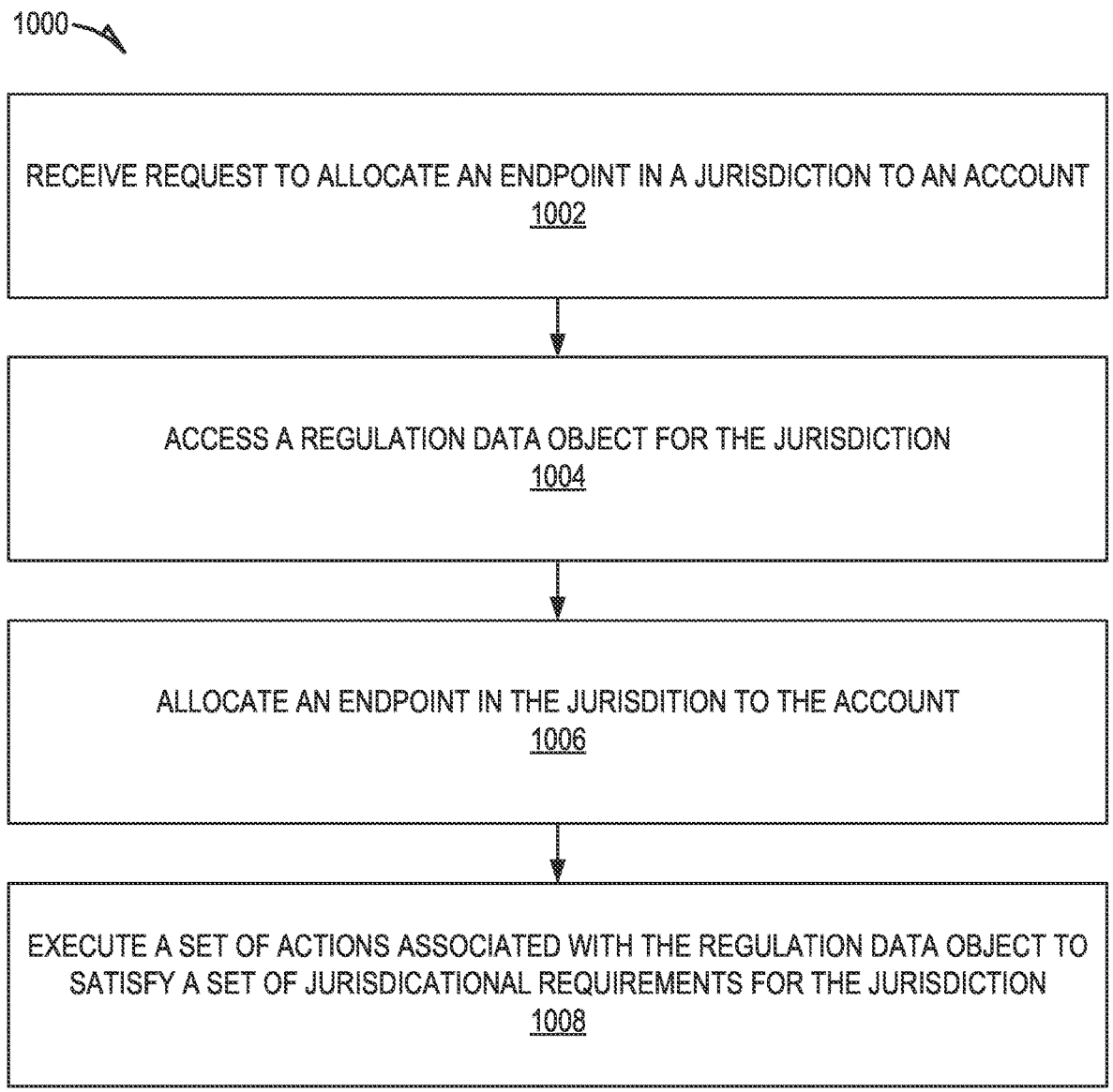
FIG. 10 is a flowchart showing a method for multi-jurisdictional endpoint allocation compliance, according to some example embodiments.

FIG. 10 is a flowchart showing a method 1000 for multi-jurisdictional endpoint allocation compliance, according to some example embodiments. The method 1000 may be embodied in computer readable instructions for execution by one or more processors such that the operations of the method 1000 may be performed in part or in whole by the multi-jurisdictional endpoint allocation system 112; accordingly, the method 1000 is described below by way of example with reference thereto. However, it shall be appreciated that at least some of the operations of the method 1000 may be deployed on various other hardware configurations and the method 1000 is not intended to be limited to the multi-jurisdiction endpoint allocation system 112.

At operation 1002, the input component 502 receives a request to allocate an endpoint in a jurisdiction to an account. The input component 502 receives requests to initiate the compliance process for an allocated endpoint. For example, the input component 502 may receive the request from the endpoint allocation component 204 upon an endpoint being allocated to an account of the cloud-based communication platform 108. The request may include data identifying the jurisdiction and the account, such as a unique identifier and/or country code associated with the jurisdiction and a unique account identifier associated with the account.

At operation 1004, the regulation accessing component 504 accesses a regulation data object for the jurisdiction. For example, the regulation accessing component 504 uses the unique identifier and/or country code associated with the jurisdiction to search the regulation databased 210 for the corresponding regulation object. The regulation accessing component 504 may provide the accessed regulation object and corresponding actions to the execution component 508.

At operation 1006, the endpoint allocation component 204 allocates an endpoint in the jurisdiction to the account. For example, the endpoint allocation component 204 identifies an available endpoint in the selected jurisdiction. An available endpoint is an endpoint managed by the cloud-based communication platform 108 that is not currently allocated to an account of the cloud-based communication platform 108.

The endpoint database 212 maintains a listing of the available endpoints managed by the cloud-based communication platform 108. The endpoint allocation component 204 communicates with the endpoint database 212 to identify an available endpoint in the selected jurisdiction. For example, the endpoint allocation component 204 searches the endpoint database 212 based on an identifier (e.g., country code) associated with the jurisdiction to identify available endpoints within the jurisdiction. The endpoint allocation component 204 then selects one of the identified available endpoints to allocate to the account.

To allocate the selected endpoint to the account, the endpoint allocation component 204 accesses account profile data for the account from the data store 214. The endpoint allocation component 204 updates the account profile data to indicate that the endpoint has been allocated to the account. The endpoint allocation component 204 may also update the endpoint database 212 to indicate that the selected endpoint has been allocated to an account and is therefore not available to be allocated to another account.

At operation 1008, the execution component 508 executes a set of actions associated with the regulation data object to satisfy a set of jurisdictional requirements for the jurisdiction. The execution component 508 executes actions to automate the process of complying with the jurisdictional requirements of a jurisdiction. For example, the execution component 508 may execute the actions associated with the regulation object to perform the compliance process. This may include accessed needed data, populating forms, generating worklists for users of the customer, and the like. As shown, the data store 214 includes a document database 608 that stores forms, workflow templates, instructions, and the like, for complying with the jurisdictional requirements for given jurisdictions. The execution component 508 may access these forms, workflow templates, and the like, from the document database 608, which are used during the compliance process.

In some embodiments, the execution component 508 gathers data to populate forms documents (e.g., forms, workflows) gathered from the customer information database 604. The execution component 508 can use the regulation object to identify the supporting proof item that will satisfy the jurisdictional requirements for the jurisdiction, which may be needed when populating a document. The execution component 508 may be able to access some of the needed data locally. For example, a customer may have provided a variety of supporting proof items to the multi-jurisdictional endpoint allocation system 112, which the execution component 508 may use to satisfy jurisdictional requirements of the jurisdiction. As shown in FIG. 6, the data store 214 may include a customer information database 604 that stores data provided and associated with the customer. For example, the customer information database 604 may include supporting proof items, such as copies of passports, government issued identifiers, and the like. The customer information database 604 may also include data identifying addresses of the customer, names of users, contact information, and the like.

The execution component 508 may search the customer information database 604 for data associated with the customer to satisfy the jurisdictional requirements. For example, the data stored in the customer information database 604 may be associated with identifiers indicating a type of the data, such as an identifier identifying a data item as being a copy of passport or an address associated with a corporate office in the jurisdiction. The supporting proof items identified in the regulation object may similar be associated with identifiers indication a type of the supporting data item. The execution component 508 may use the identifiers associated with the supporting data items listed in the regulation object to search for data items stored in the customer information database 604 that have a matching identifier, indicating that the data item is the supporting data items to satisfy the corresponding jurisdictional requirement.

Alternatively, the execution component 508 may request data from customers, such as by transmitting messages to specified users for the needed data items. As another example, the execution component 508 may generate workflows that are provided to the customer, which identify steps/action to be performed by the customer. This may include providing the specified data items to the multi-jurisdictional endpoint allocation system 112 and/or submitting specified forms, documents and/or data to a specified entity.

Some of the actions may be executed by execution component 508 without user intervention. For example, the execution component 508 may be able populate and submit forms in some jurisdictions without user intervention. Some actions, however, may require some human intervention. For example, some jurisdictions may require that physical signatures be provided on forms and/or that physical copies of the forms be provided via mail. In these types of situations, the execution component 508 may perform the actions by generating instructions and/or a workflow that identifies the actions to be performed by a user to satisfy the jurisdictional requirements. The execution component 508 may then provide the instructions and/or workflow to a designated user or users of the associated customer. The actions performed by the user may be in conjunction with actions performed by the execution component 508. For example, the execution component 508 may populate a form and provide the form to a designated human user along with instructions on how to complete and properly submit the form, such as by signing the form and mailing a physical copy to a specified address.

In some embodiments, the actions associated with a regulation object may include sets of actions designated to be performed by different roles of users. For example, a set of actions may be designated to be performed by a user in an administrator role, a user in a reviewer role, a customer role, and the like. In this type of embodiment, the execution component 508 performs and/or coordinates the set of actions defined for each role. For example, the execution component 508 may prompt a user in one role to provide specified data, populate a form based on the provided data, and then provide the populated form to a user in a different role for signature and submission.

FIG. 11 is a flowchart showing a method for updating jurisdictional requirements, according to some example embodiments. The method 1100 may be embodied in computer readable instructions for execution by one or more processors such that the operations of the method 1100 may be performed in part or in whole by the multi-jurisdictional endpoint allocation system 112; accordingly, the method 1100 is described below by way of example with reference thereto. However, it shall be appreciated that at least some of the operations of the method 1100 may be deployed on various other hardware configurations and the method 1100 is not intended to be limited to the multi-jurisdictional endpoint allocation system 112.

At operation 1102, the update receiving component 702 receives a request to update a set of jurisdictional requirements for a jurisdiction. A request may be received from a client device 102, such as a client device 102 associated with an administrator or other authorized user of the of the cloud-based communication platform 108 and/or multi-jurisdictional endpoint allocation system 112. As another example, the request may be received from a client device 102 of a user associated with the jurisdiction, such as the governing body of the jurisdiction. The request may identify the jurisdiction, such as by including a unique identifier and/or country code for the jurisdiction. The request may also include data identifying an updated set of jurisdictional requirements and/or associated actions to be performed by the multi-jurisdictional endpoint allocation system 112 to provide compliance with the jurisdictional requirements.

At operation 1104, the regulation object updating component 704 accesses a regulation data object for the jurisdiction. For example, the regulation object updating component 704 uses the unique identifier and/or country code to identify the regulation object from the regulation database 210.

At operation 1106, the regulation object updating component 704 modifies the regulation data object based on the request. For example, the regulation object updating component 704 updates the regulation object based on the updated set of jurisdictional requirements and/or associated actions identified in the request. The regulation object updating component 704 stores the updated regulation object in the regulation database 210, where it can be used by the other components of the multi-jurisdictional endpoint allocation system 112 to provide compliance with jurisdictional requirements in the jurisdiction.

At operation 1108, the compliance checking component 706 determines whether a modified set of jurisdictional requirements for the jurisdiction are satisfied based on a data bundle associated with an allocated endpoint in the jurisdiction. For example, the compliance checking component 706 identifies endpoint from the jurisdiction that have been allocated to accounts of the cloud-based communication platform 108. To determine whether the jurisdictional requirements have been satisfied for an allocated endpoint, the multi-jurisdictional endpoint allocation system 112 accesses a data bundle associated with the endpoint from the customer compliance database 606. The data bundle includes and/or identifies the data and documentation used to satisfy the jurisdictional requirements when the endpoint was allocated to the account. The compliance checking component 706 may check whether the previously submitted data satisfies the updated jurisdictional requirements.

The compliance checking component 706 provides the notification component 708 with data indicating whether the endpoint does or does not comply with the updated jurisdictional requirements. In the event that the updated jurisdictional requirements are not satisfied, the notification component 708 communicates with the jurisdictional compliance component 206 to reinitiate the compliance process for the endpoints based on the updated regulation object. The notification component 708 may also notify the customer associated with the account regarding whether the endpoint does or does not comply with the updated jurisdictional requirements.

Software Architecture

Figure 12:
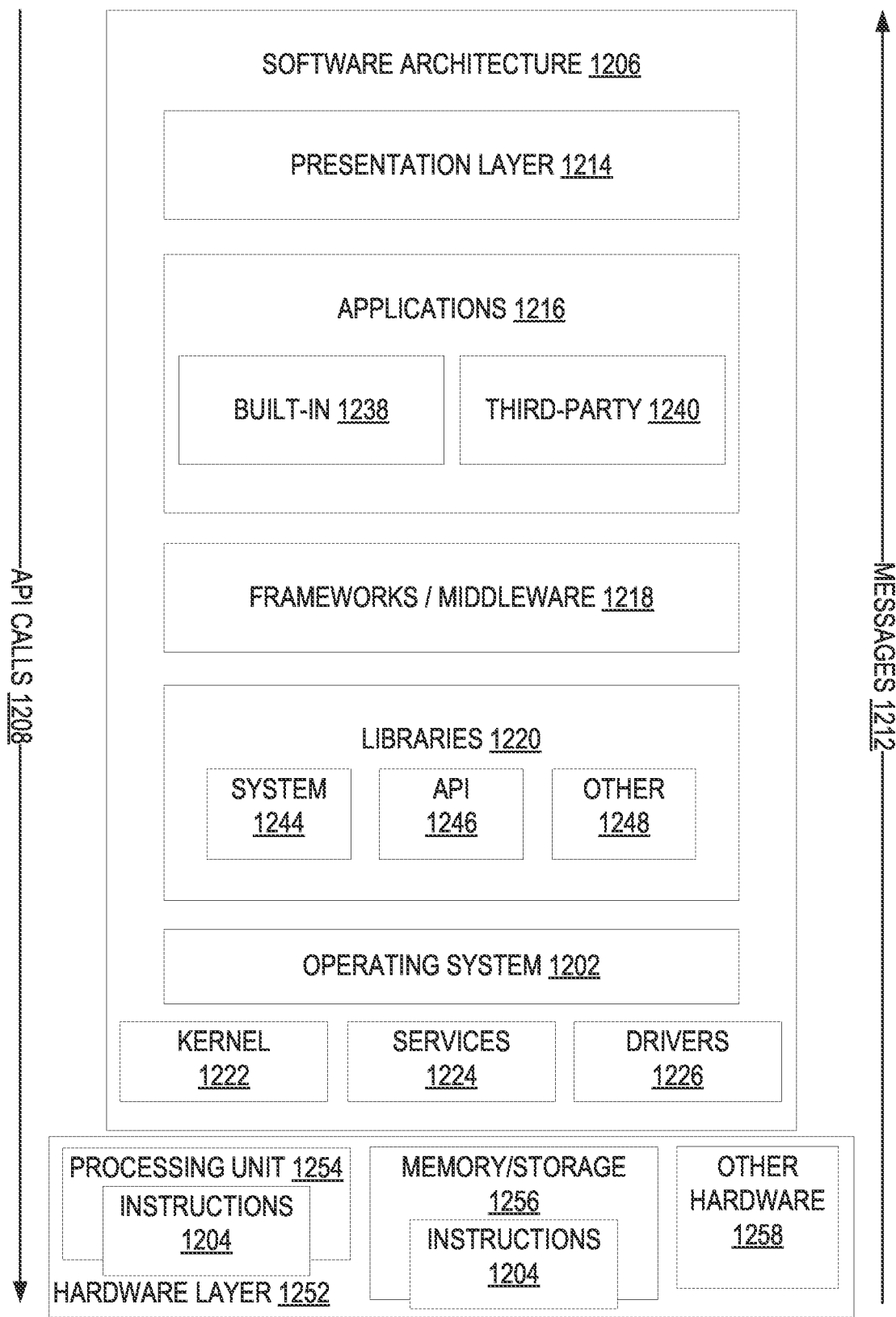
FIG. 12 is a block diagram illustrating components of a machine, according to some example embodiments, able to read instructions from a machine-readable medium (e.g., a machine-readable storage medium) and perform any one or more of the methodologies discussed herein.

FIG. 12 is a block diagram illustrating an example software architecture 1206, which may be used in conjunction with various hardware architectures herein described. FIG. 12 is a non-limiting example of a software architecture 1206 and it will be appreciated that many other architectures may be implemented to facilitate the functionality described herein. The software architecture 1206 may execute on hardware such as machine 1300 of FIG. 13 that includes, among other things, processors 1304, memory 1314, and (input/output) I/O components 1318. A representative hardware layer 1252 is illustrated and can represent, for example, the machine 1300 of FIG. 13. The representative hardware layer 1252 includes a processing unit 1254 having associated executable instructions 1204. Executable instructions 1204 represent the executable instructions of the software architecture 1206, including implementation of the methods, components, and so forth described herein. The hardware layer 1252 also includes memory and/or storage modules 1256, which also have executable instructions 1204. The hardware layer 1252 may also comprise other hardware 1258.

In the example architecture of FIG. 12, the software architecture 1206 may be conceptualized as a stack of layers where each layer provides particular functionality. For example, the software architecture 1206 may include layers such as an operating system 1202, libraries 1220, frameworks/middleware 1218, applications 1216, and a presentation layer 1214. Operationally, the applications 1216 and/or other components within the layers may invoke application programming interface (API) calls 1208 through the software stack and receive a response such as messages 1212 in response to the API calls 1208. The layers illustrated are representative in nature and not all software architectures have all layers. For example, some mobile or special purpose operating systems may not provide a frameworks/middleware 1218, while others may provide such a layer. Other software architectures may include additional or different layers.

The operating system 1202 may manage hardware resources and provide common services. The operating system 1202 may include, for example, a kernel 1222, services 1224, and drivers 1226. The kernel 1222 may act as an abstraction layer between the hardware and the other software layers. For example, the kernel 1222 may be responsible for memory management, processor management scheduling), component management, networking, security settings, and so on. The services 1224 may provide other common services for the other software layers. The drivers 1226 are responsible for controlling or interfacing with the underlying hardware. For instance, the drivers 1226 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 1220 provide a common infrastructure that is used by the applications 1216 and/or other components and/or layers. The libraries 1220 provide functionality that allows other software components to perform tasks in an easier fashion than to interface directly with the underlying operating system 1202 functionality (e.g., kernel 1222, services 1224, and/or drivers 1226). The libraries 1220 may include system libraries 1244 (e.g., C standard library) that may provide functions such as memory allocation functions, string manipulation functions, mathematical functions, and the like. In addition, the libraries 1220 may include API libraries 1246 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1220 may also include a wide variety of other libraries 1248 to provide many other APIs to the applications 1216 and other software components/modules.

The frameworks/middleware 1218 (also sometimes referred to as middleware) provide a higher-level common infrastructure that may be used by the applications 1216 and/or other software components/modules. For example, the frameworks/middleware 1218 may provide various graphical user interface (GUI) functions, high-level resource management, high-level location services, and so forth. The frameworks/middleware 1218 may provide a broad spectrum of other APIs that may be used by the applications 1216 and/or other software components/modules, some of which may be specific to a particular operating system 1202 or platform.

The applications 1216 include built-in applications 1238 and/or third-party applications 1240. Examples of representative built-in applications 1238 may include, but are not limited to, a contacts application, a browser application, a book reader application, a location application, a media application, a messaging application, and/or a game application. Third-party applications 1240 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1240 may invoke the API calls 1208 provided by the mobile operating system (such as operating system 1202) to facilitate functionality described herein.

The applications 1216 may use built in operating system functions (e.g., kernel 1222, services 1224, and/or drivers 1226), libraries 1220, and frameworks/middleware 1218 to create UIs to interact with users of the system. Alternatively, or additionally, in some systems, interactions with a user may occur through a presentation layer, such as presentation layer 1214. In these systems, the application/component "logic" can be separated from the aspects of the application/component that interact with a user.

Figure 13:
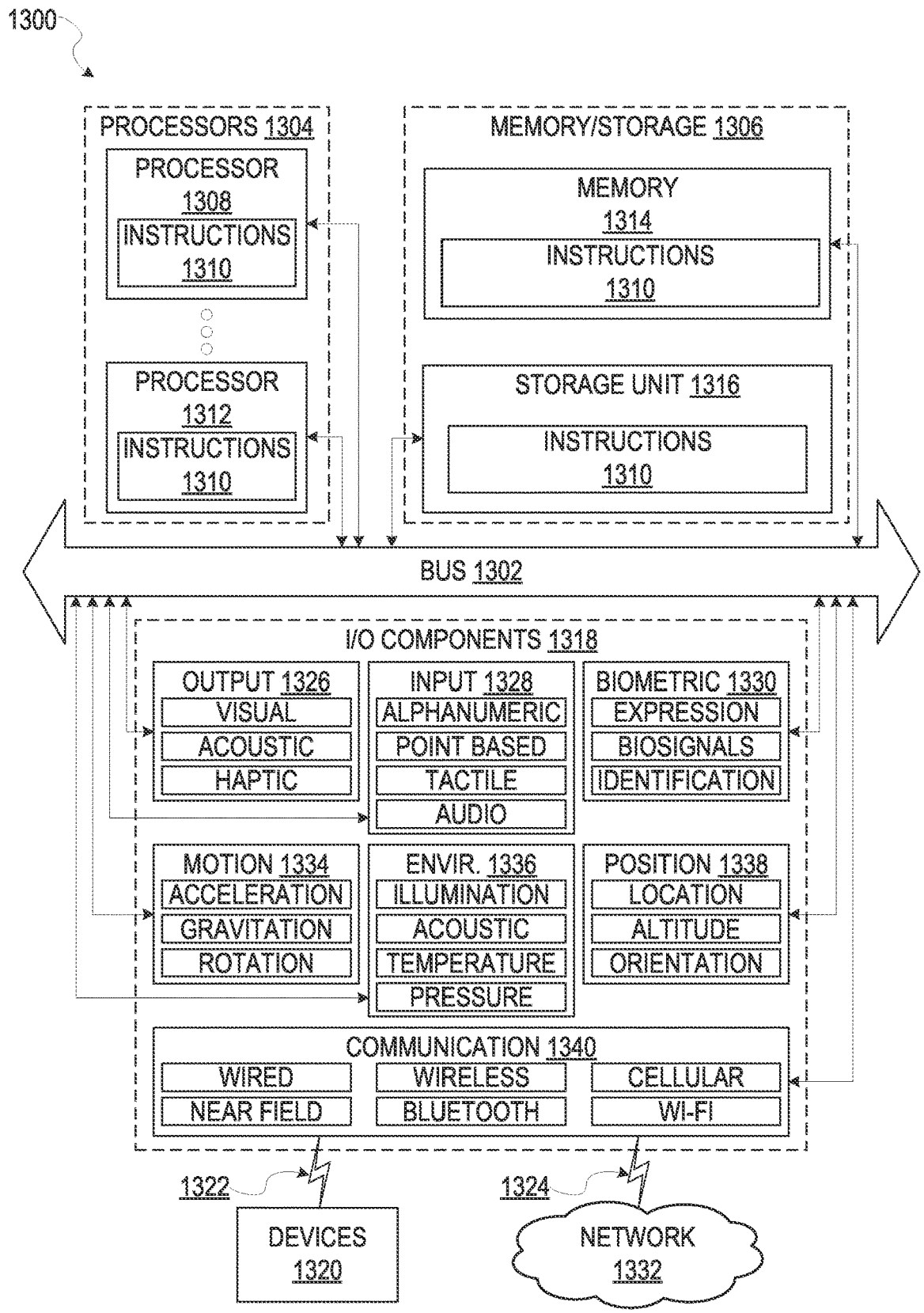
FIG. 13 is a block diagram illustrating components of a machine, according to some example embodiments, able to read instructions from a machine-readable medium (e.g., a machine-readable storage medium) and perform any one or more of the methodologies discussed herein.

FIG. 13 is a block diagram illustrating components of a machine 1300, according to some example embodiments, able to read instructions 1204 from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1310 (e.g., software, a program, an application, an applet, an app, or other executable code) for causing the machine 1300 to perform any one or more of the methodologies discussed herein may be executed. As such, the instructions 1310 may be used to implement modules or components described herein. The instructions 1310 transform the general, non-programmed machine 1300 into a particular machine 1300 programmed to carry out the described and illustrated functions in the manner described. In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 1300 capable of executing the instructions 1310, sequentially or otherwise, that specify actions to be taken by machine 1300. Further, while only a single machine 1300 is illustrated, the term "machine" shall also be taken to include a collection of machines that individually or jointly execute the instructions 1310 to perform any one or more of the methodologies discussed herein.

The machine 1300 may include processors 1304, memory/storage 1306, and I/O components 1318, which may be configured to communicate with each other such as via a bus 1302. The memory/storage 1306 may include a memory 1314, such as a main memory, or other memory storage, and a storage unit 1316, both accessible to the processors 1304 such as via the bus 1302. The storage unit 1316 and memory 1314 store the instructions 1310 embodying any one or more of the methodologies or functions described herein. The instructions 1310 may also reside, completely or partially, within the memory 1314, within the storage unit 1316, within at least one of the processors 1304 (e.g., within the processor's cache memory), or any suitable combination thereof, during execution thereof by the machine 1300. Accordingly, the memory 1314, the storage unit 1316, and the memory of processors 1304 are examples of machine-readable media.

The I/O components 1318 may include a wide variety of components to receive input, provide output, produce output, transmit information, exchange information, capture measurements, and so on. The specific I/O components 1318 that are included in a particular machine 1300 will depend on the type of machine. For example, portable machines such as mobile phones will likely include a touch input device or other such input mechanisms, while a headless server machine will likely not include such a touch input device. It will be appreciated that the I/O components 1318 may include many other components that are not shown in FIG. 13. The I/O components 1318 are grouped according to functionality merely for simplifying the following discussion and the grouping is in no way limiting. In various example embodiments, the I/O components 1318 may include output components 1326 and input components 1328. The output components 1326 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1328 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1318 may include biometric components 1330, motion components 1334, environmental components 1336, or position components 1338 among a wide array of other components. For example, the biometric components 1330 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1334 may include acceleration sensor components (e.g., accelerometer), gravitation sensor components, rotation sensor components (e.g., gyroscope), and so forth. The environmental components 1336 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1338 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1318 may include communication components 1340 operable to couple the machine 1300 to a network 1332 or devices 1320 via coupling 1324 and coupling 1322, respectively. For example, the communication components 1340 may include a network interface component or other suitable device to interface with the network 1332. In further examples, communication components 1340 may include wired communication components, wireless communication components, cellular communication components, near field communication (NFC) components, Bluetooth® components (e.g., Bluetooth® Low Energy), Wi-Pi® components, and other communication components to provide communication via other modalities. The devices 1320 may be another machine or any of a wide variety of peripheral devices (e.g., a peripheral device coupled via a USB).

Moreover, the communication components 1340 may detect identifiers or include components operable to detect identifiers. For example, the communication components 1340 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g, microphones to identify tagged audio signals). In addition, a variety of information may be derived via the communication components 1340 such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 1310 for execution by the machine 1300, and includes digital or analog communications signals or other intangible medium to facilitate communication of such instructions 1310. Instructions 1310 may be transmitted or received over the network 1332 using a transmission medium via a network interface device and using any one of a number of well-known transfer protocols.

"CLIENT DEVICE" in this context refers to any machine 1300 that interfaces to a communications network 1332 to obtain resources from one or more server systems or other client devices 102, 104. A client device 102, 104 may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 1332.

"COMMUNICATIONS NETWORK" in this context refers to one or more portions of a network 1332 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 1332 or a portion of a network 1332 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 1310 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 1310. The term "machine-readable medium" shall also be taken to include any medium, or combination of multiple media, that is capable of storing instructions 1310 (e.g., code) for execution by a machine 1300, such that the instructions 1310, when executed by one or more processors 1304 of the machine 1300, cause the machine 1300 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 1304) may be configured by software (e.g., an application 1216 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 1304 or other programmable processor 1304. Once configured by such software, hardware components become specific machines 1300 (or specific components of a machine 1300) uniquely tailored to perform the configured functions and are no longer general-purpose processors 1304. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 1304 configured by software to become a special-purpose processor, the general-purpose processor 1304 may be configured as respectively different special-purpose processors (e.g., comprising different hardware components) at different times. Software accordingly configures a particular processor or processors 1304, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 1302) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 1304 that are temporarily configured (e.g., by software) or permanently configured to perform the relevant operations. Whether temporarily or permanently configured, such processors 1304 may constitute processor-implemented components that operate to perform one or more operations or functions described herein. As used herein, "processor-implemented component" refers to a hardware component implemented using one or more processors 1304. Similarly, the methods described herein may be at least partially processor-implemented, with a particular processor or processors 1304 being an example of hardware. For example, at least some of the operations of a method may be performed by one or more processors 1304 or processor-implemented components. Moreover, the one or more processors 1304 may also operate to support performance of the relevant operations in a "cloud computing" environment or as a "software as a service" (SaaS). For example, at least some of the operations may be performed by a group of computers (as examples of machines 1300 including processors 1304), with these operations being accessible via a network 1332 (e.g., the Internet) and via one or more appropriate interfaces (e.g., an API). The performance of certain of the operations may be distributed among the processors 1304, not only residing within a single machine 1300, but deployed across a number of machines 1300. In some example embodiments, the processors 1304 or processor-implemented components may be located in a single geographic location (e.g., within a home environment, an office environment, or a server farm). In other example embodiments, the processors 1304 or processor-implemented components may be distributed across a number of geographic locations.

"PROCESSOR" in this context refers to any circuit or virtual circuit (a physical circuit emulated by logic executing on an actual processor 1304) that manipulates data values according to control signals (e.g., "commands," "op codes," "machine code," etc.) and which produces corresponding output signals that are applied to operate a machine 1300. A processor 1304 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 1304 may further be a multi-core processor having two or more independent processors 1304 (sometimes referred to as "cores") that may execute instructions 1310 contemporaneously.

What is claimed is:

1. A method comprising:
receiving an Application Programming Interface (API) request to allocate a new endpoint in a specified jurisdiction, the API request being based on an API provided by a communication platform;
in response to the API request, accessing a data object defining a set of jurisdictional requirements established by a governing body of the specified jurisdiction;
allocating an available endpoint in the specified jurisdiction to an account of the communication platform associated with the API request;
determining a set of actions to satisfy the set of jurisdictional requirements defined by the governing body of the specified jurisdiction; and
executing the set of actions based on data associated with the account.

2. The method of claim 1, wherein the data object is accessed from a regulation database that maintains a plurality of data objects defining a plurality of sets of jurisdictional requirements.

3. The method of claim 1, wherein executing the set of actions comprises:
  populating, based on data associated with first account, a first form that at least partially satisfies the set of jurisdictional requirements, yielding a populated jurisdictional form; and
  causing submission of the populated jurisdictional form to a receiving entity of the specified jurisdiction.

4. The method of claim 3, wherein populating the first form comprises:
  identifying; the first form from a set of available forms, the first form including at least a first data field;
  accessing a first data value associated with the account based on the first data field; and
  populating the first data field of the first form with the first data value.

5. The method of claim 1, wherein executing the set of actions comprises:
  identifying, based on the data object, a set of supporting proof items that satisfy a first jurisdictional requirement from the set of jurisdictional requirements; and
  accessing a supporting proof item associated with the account that is included in the set of supporting proof items that satisfy the first jurisdictional requirement.

6. The method of claim 1, wherein executing the set of actions comprises:
  identifying, based on the data object, a set of supporting proof items that satisfy a first jurisdictional requirement from the set of jurisdictional requirements; and
  transmitting, to a client device associated with the account, a message including a prompt to provide a supporting proof item included in the set of supporting proof items that satisfy the first jurisdictional requirement.

7. The method of claim 1, wherein executing the set of actions comprises:
  identifying a first user associated with the account that is assigned to a first role and a second user associated with the account that is assigned to a second role that is different than the first role;
  transmitting, to the first user, a first workflow for complying with the set of jurisdictional requirements, the first workflow being associated with the first role; and
  transmitting, to the second user, a second workflow for complying with the set of jurisdictional requirements, the second workflow being different than the first workflow and the second workflow being associated with the second role.

8. The method of claim 1, further comprising:
  receiving a second API request to update the set of jurisdictional requirements for the specified jurisdiction;
  accessing the data object defining the set of jurisdictional requirements; and
  modifying the data object based on the second API request, yielding a modified data object defining a modified set of jurisdictional requirements.

9. The method of claim 8, further comprising:
  determining, based on a data bundle associated with the available endpoint, whether the modified set of jurisdictional requirements has been satisfied.

10. The method of claim 9, further comprising:
  in response to determining that the modified set of jurisdictional requirements has not been satisfied, executing at least a portion of a set of actions associated with the modified data object to comply with the modified set of jurisdictional requirements.

11. The method of claim 9, further comprising:
  in response to determining that the modified set of jurisdictional requirements has been satisfied, transmitting a notification to a client device associated with the account, the notification indicating that the modified set of jurisdictional requirements has been satisfied.

12. A communication platform comprising:
  one or more computer processors; and
  one or more computer-readable mediums storing instructions that, when executed by the one or more computer processors, cause the communication platform to perform operations comprising:
  receiving an Application Programming Interface (API) request to allocate a new endpoint in a specified jurisdiction, the API request being based on an API provided by the communication platform;
  in response to the API request, accessing a data object defining a set of jurisdictional requirements established by a governing body of the specified jurisdiction;
  allocating an available endpoint in the specified jurisdiction to an account of the communication platform associated with the API request;
  determining a set of actions to satisfy the set of jurisdictional requirements defined by the governing body of the specified jurisdiction; and
  executing the set of actions based on data associated with the account.

13. The communication platform of claim 12, wherein the data object is accessed from a regulation database that maintains a plurality of data objects defining a plurality of sets of jurisdictional requirements.

14. The communication platform of claim 12, wherein executing the set of actions comprises:
  populating, based on data associated with first account, a first form that at least partially satisfies the set of jurisdictional requirements, yielding a populated jurisdictional form; and
  causing submission of the populated jurisdictional form to a receiving entity of the specified jurisdiction.

15. The communication platform of claim 14, wherein populating the first form comprises:
  identifying the first form from a set of available forms, the first form including at least a first data field;
  accessing a first data value associated with the account based on the first data field; and
  populating the first data field of the first form with the first data value.

16. The communication platform of claim 12, wherein executing the set of actions comprises:
  identifying, based on the data object, a set of supporting proof items that satisfy a first jurisdictional requirement from the set of jurisdictional requirements; and
  accessing a supporting proof item associated with the account that is included in the set of supporting proof items that satisfy the first jurisdictional requirement.

17. The communication platform of claim 12, wherein executing the set of actions comprises:
  identifying, based on the data object, a set of supporting proof items that satisfy a first jurisdictional requirement from the set of jurisdictional requirements; and
  transmitting, to a client device associated with the account, a message including a prompt to provide a supporting proof item included in the set of supporting proof items that satisfy the first jurisdictional requirement.

18. The communication platform of claim 12, wherein executing the set of actions comprises:
   identifying a first user associated with the account that is assigned to a first role and a second user associated with the account that is assigned to a second role that is different than the first role;
   transmitting, to the first user, a first workflow for complying with the set of jurisdictional requirements, the first workflow being associated with the first role; and
   transmitting, to the second user, a second workflow for complying with the set of jurisdictional requirements, the second workflow being different than the first workflow and the second workflow being associated with the second role.

19. The communication platform of claim 12, the operations further comprising:
   receiving a second API request to update the set of jurisdictional requirements for the specified jurisdiction;
   accessing the data object defining the set of jurisdictional requirements; and
   modifying the data object based on the second API request, yielding a modified data object defining a modified set of jurisdictional requirements.

20. A non-transitory computer-readable medium storing instructions that, when executed by one or more computer processors of a communication platform, cause the communication platform to perform operations comprising:
   receiving an Application Programming Interface (API) request to allocate a new endpoint in a specified jurisdiction, the API request being based on an API provided by the communication platform;
   in response to the API request, accessing a data object defining a set of jurisdictional requirements established by a governing body of the specified jurisdiction;
   allocating an available endpoint in the specified jurisdiction to an account of the communication platform associated with the API request;
   determining a set of actions to satisfy the set of jurisdictional requirements defined by the governing body of the specified jurisdiction; and
   executing the set of actions based on data associated with the account.

* * * * *